United States Patent [19]

Blalock

[11] Patent Number: 5,735,605
[45] Date of Patent: Apr. 7, 1998

[54] THERMOCOUPLE TEMPERATURE PROBE ADAPTER

[75] Inventor: Allen V. Blalock, Knoxville, Tenn.

[73] Assignee: DeRoyal Industries, Inc., Powell, Tenn.

[21] Appl. No.: 720,722

[22] Filed: Oct. 2, 1996

[51] Int. Cl.[6] .............................. G01K 7/04; G01K 7/14; G01K 7/00
[52] U.S. Cl. ................................ 374/179; 374/183
[58] Field of Search ........................ 374/179, 183, 374/208

[56] References Cited

U.S. PATENT DOCUMENTS

| | | | |
|---|---|---|---|
| 3,906,391 | 9/1975 | Murdock | 331/66 |
| 4,161,880 | 7/1979 | Prosky | 374/158 |
| 4,293,916 | 10/1981 | Del Re et al. | 364/571 |
| 4,403,296 | 9/1983 | Prosky | 364/573 |
| 4,481,596 | 11/1984 | Townzen | 364/571 |
| 4,669,049 | 5/1987 | Kosednar et al. | 364/557 |
| 5,066,140 | 11/1991 | Beran | 374/134 |
| 5,088,835 | 2/1992 | Shigezawa et al. | 374/181 |
| 5,161,892 | 11/1992 | Shigezawa et al. | 374/179 |
| 5,161,893 | 11/1992 | Shigezawa et al. | 374/181 |
| 5,333,784 | 8/1994 | Pompei | 374/179 |

OTHER PUBLICATIONS

"The Temperature Handbook." Omega Engineering, vol. 29, pp. K-84 to K-86, J-11, J-12 (1995).

Primary Examiner—Diego F. F. Gutierrez
Attorney, Agent, or Firm—Luedeka, Neely & Graham, P.C.

[57] ABSTRACT

An apparatus is disclosed which adapts the output signal of a thermocouple temperature sensor to be electrically the same as the output signal of a thermistor temperature sensor. The disclosed apparatus, which consists of a conversion circuit, a translation circuit, and an output control circuit, makes the thermocouple temperature sensor compatible with a temperature measuring instrument which is designed for use with a thermistor temperature sensor. The conversion circuit converts the small electrical voltage produced by a thermocouple temperature sensor into a substantial electrical voltage representing the temperature at the location of the thermocouple temperature sensor. The translation circuit translates the electrical voltage at the output of the conversion circuit into an analog electrical signal which is proportional to an electrical voltage that would exist across the terminals of a thermistor temperature sensor exposed to the same temperature as the thermocouple temperature sensor. The output control circuit produces an output voltage at the output terminals of the apparatus which varies as a function of the electrical signal at the output of the translation circuit. This output voltage is equivalent to the electrical voltage which would exist across the terminals of a thermistor temperature sensor if the thermistor temperature sensor was connected to the temperature measuring instrument's input and was exposed to the same temperature as the thermocouple temperature sensor.

14 Claims, 12 Drawing Sheets

THERMOCOUPLE TEMPERATURE PROBE ADAPTER

TECHNICAL FIELD

The present invention relates to an adapter which permits a temperature measuring instrument designed for use with a certain type of temperature sensor to be compatible with another type of temperature sensor. More particularly, it relates to an adapter which permits a temperature measuring instrument designed for use with a thermistor temperature sensor to be compatible with the output signal of a thermocouple temperature sensor.

BACKGROUND

Many of the instruments used in the medical and veterinary fields to monitor and display patient body temperature are designed for use with thermistor temperature sensors. A thermistor is a device which has an electrical resistance which varies as an exponential function of the device temperature. An instrument designed for use with a thermistor sensor measures the thermistor resistance across the instrument's input terminals and converts this resistance to a temperature value.

Another type of commonly used temperature sensor is the thermocouple. A thermocouple is formed by a junction of two tiny wires of dissimilar metals such as copper and constantan. An electrical voltage develops across the junction, the voltage varying as a function of the temperature at the location of the junction. Because of its small size, the thermocouple sensor can be conveniently applied to any selected point on or in the patient's body, and because of its small thermal "mass", the thermocouple sensor responds rapidly to changes in the patient's body temperature.

Due to practical considerations, the temperature sensors used in conjunction with temperature measuring instruments are typically used only once. Since the temperature sensor must be disposable and since the thermocouple is significantly less expensive than the thermistor, the owners of temperature measuring instruments designed for use with thermistor sensors would prefer to use thermocouple sensors. Due to the cost of replacing these temperature measuring instruments with instruments that are compatible with thermocouple sensors, it is desirable to be able to use thermocouple sensors with the existing equipment.

One approach to an adapter intended to interface thermocouple sensors with temperature measuring instruments designed for use with thermistor sensors is disclosed by Kosednar et al. in U.S. Pat. No. 4,669,049. Kosednar converted the analog voltage signal from the thermocouple sensor into a digital signal. This digital signal was converted, by means of a "look-up table" stored in a computer, into a second digital signal which represented the resistance of a thermistor sensor exposed to the same temperature to which the thermocouple sensor was exposed. This second digital signal was used to control a resistor switching circuit which placed the proper value of resistance across the output terminals of the adapter to emulate a thermistor sensor.

Another approach to such an adapter is disclosed by Beran in U.S. Pat. No. 5,066,140. Beran also converted the analog voltage signal from the thermocouple sensor into a digital signal. This digital signal was used to control the pulse repetition frequency of a clock such that the clock frequency varied as a nonlinear function of the digital version of the thermocouple sensor signal. In this manner, the clock frequency was made to vary as a function of temperature in the same way that a thermistor resistance would vary as a function of temperature. The clock signal was used to control the switching speed of a "switched-capacitor resistor" circuit, a circuit which has a resistance which varies as a function of the speed at which a pair of capacitors are charged and discharged. In this manner, the resistance value of the switched-capacitor resistor was made to emulate the resistance value of a thermistor sensor. This approach is limited to use with temperature measuring instruments which provide a DC excitation current at their sensor connection terminals.

Any approach which includes the step of converting the analog thermocouple voltage signal into a digital signal will result in conversion errors, these errors being caused by the finite resolution of the analog-to-digital converter. Conversion of the digitized thermocouple voltage signal into a thermistor resistance signal by use of a look-up table also results in errors. These errors result from the practical limitation on the number of entries in, and resolution of, such a table.

Conversion errors, whether caused by the analog-to-digital conversion process or by the look-up table conversion process, result in errors in the temperature measurement. The magnitude of these errors is determined by the resolution of the analog-to-digital converter and the resolution of the look-up table. Also, conversion from analog to digital and back to analog provides numerous unnecessary failure modes.

SUMMARY

The present invention aims to overcome the difficulties presented by the prior art by implementing an adapter in completely analog circuitry, thereby eliminating the need for any analog-to-digital conversion. The invention consists of a conversion circuit, a translation circuit, and an output control circuit. The conversion circuit converts the small electrical voltage produced by a thermocouple temperature sensor into a substantial electrical voltage representing the temperature at the location of the thermocouple temperature sensor. The translation circuit translates the electrical voltage at the output of the conversion circuit into an analog electrical signal which is proportional to an electrical voltage that would exist across the terminals of a thermistor temperature sensor exposed to the same temperature as the thermocouple temperature sensor. The output control circuit produces an output voltage at the adapter output terminals which varies as a function of the electrical signal at the output of the translation circuit. This output voltage is equivalent to the electrical voltage which would exist across the terminals of a thermistor temperature sensor if the thermistor temperature sensor was connected to the temperature measuring instrument's input and was exposed to the same temperature as the thermocouple temperature sensor.

The translation circuit comprises a completely analog circuit with an inherent transfer function. The input to the transfer function is the output voltage from the conversion circuit. The output of the transfer function is an analog electrical signal representing the voltage which would exist across the terminals of a thermistor temperature sensor if the thermistor temperature sensor were exposed to the same temperature as the thermocouple temperature sensor. As part of the translation process, the translation circuit produces a first frequency signal which is proportional to the output voltage from the conversion circuit, and produces zero-, first-, and second-order coefficient voltage signals, the values of which vary only as a function of the ambient temperature at the location of the adapter. The translation circuit multiplies the first frequency signal with the second-order coefficient voltage signal to produce an intermediate voltage signal which varies as a function of the temperature at the location of the thermocouple temperature sensor and as a function of the ambient temperature at the location of the adapter. The translation circuit also multiplies the first frequency signal with the intermediate voltage signal to produce a second-order product voltage signal which varies as a function of the temperature at the location of the thermocouple temperature sensor and as a function of the ambient temperature at the location of the adapter. In a similar manner, the translation circuit multiplies the first frequency signal with the first-order coefficient voltage signal to produce a first-order product voltage signal which also varies as a function of the temperature at the location of the thermocouple temperature sensor and as a function of the ambient temperature at the location of the adapter. The translation circuit includes means for summing the first- and second-order product voltage signals with the zero-order coefficient voltage signal to form a quadratic voltage signal. Finally, the translation circuit produces a second frequency signal at the output of the translation circuit, the second frequency signal being proportional to an exponential function of the quadratic voltage signal.

The translation circuit includes means for adjusting the levels of the zero-, first-, and second-order coefficient voltage signals so that variations in circuit signal levels produced by variations in the ambient temperature at the location of the adapter are canceled out, thus making the second frequency signal independent of the variations in temperature at the location of the adapter.

The output control circuit provides a voltage at the adapter's output terminals which is equivalent to the voltage which would exist across the terminals of a thermistor temperature sensor exposed to the same temperature as the thermocouple temperature sensor if the thermistor temperature sensor were provided a current equivalent to the excitation current provided by the temperature measuring instrument at the adapter's output terminals. The output control circuit includes means for sensing the level of excitation current provided by the temperature measuring instrument connected at the adapter's output terminals. Therefore, the output voltage provided by the output control circuit varies as a function of the electrical signal at the output of the translation circuit and as a function of the level of the excitation current.

BRIEF DESCRIPTION OF THE DRAWINGS

Relative to the drawings wherein like reference characters designate like or similar elements throughout the several drawing figures.

DETAILED DESCRIPTION OF A PREFERRED EMBODIMENT

Figure 1:
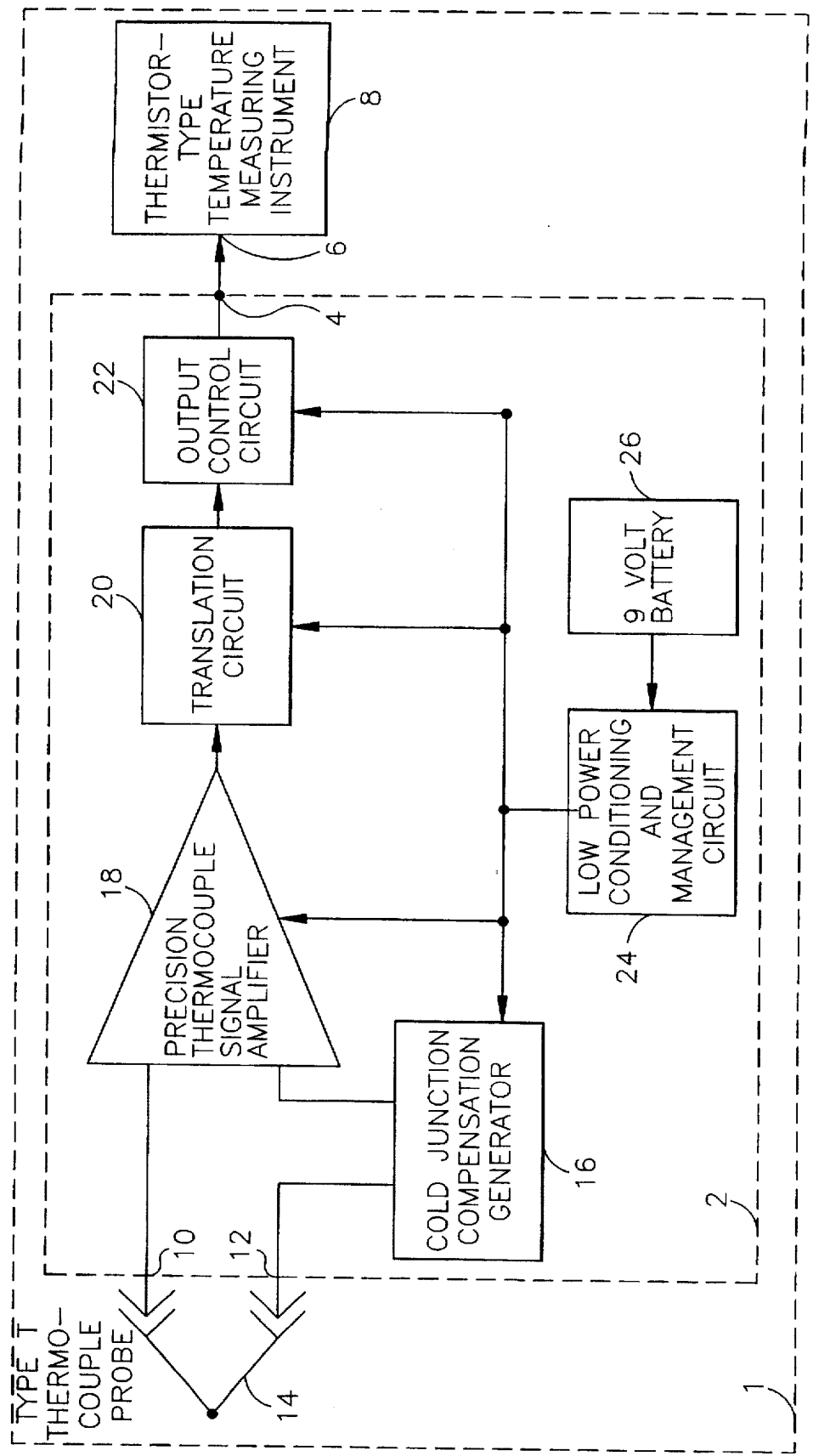
FIG. 1 is a block diagram of the adapter.

FIG. 1 shows a temperature measuring system 1 for use in measuring temperature, such as the body temperature of a medical or veterinary patient. The system consists of a thermocouple temperature sensor 14 (hereinafter referred to as the thermocouple), a temperature measuring instrument 8, which is compatible with a thermistor temperature sensor at the instrument's input 6, and an adapter 2 which converts the voltage at the output of the thermocouple 14 into a signal which is compatible with the temperature measuring instrument 8. The temperature measuring instrument 8 is an instrument such as those typically used in the medical and veterinary fields to measure and display body temperature. The adapter 2 has input terminals 10 and 12 at which the thermocouple 14 is connected, and output terminals 4 for connection to the input 6 of the temperature measuring instrument 8.

The typical use of the temperature measuring system 1 would involve the placement of the thermocouple 14 either on or in the patient's body, and the monitoring of the patient's body temperature measured at the thermocouple location. Such monitoring is typically accomplished by use of a display which may be a component of the temperature measuring instrument 8.

The thermocouple 14 consists of a junction of dissimilar metals, such as copper and constantan, which produces a voltage across the terminals 10 and 12 varying as a function of the changing temperature in the region where the thermocouple 14 is located. This temperature is hereinafter referred to as the hot junction temperature. The physical electrical junctions formed by terminals 10 and 12 together comprise the cold junction of the thermocouple 14. Attention is paid to the arrangement of terminals 10 and 12 such that they experience the same temperature (hereinafter referred to as the cold junction temperature).

The voltage across the terminals 10 and 12 is summed with a voltage produced by a cold junction compensation generator 16. The cold junction compensation generator 16 incorporates a commercially available device of type number LT1025 to produce a voltage equivalent to the voltage produced by a thermocouple of the same type as thermocouple 14 when the thermocouple of the same type as thermocouple 14 is experiencing a cold junction temperature fixed at zero degrees Celsius and a hot junction temperature which is the same as the cold junction temperature of the thermocouple 14. Various circuits which accomplish thermocouple cold junction compensation using the LT1025 device are detailed in the Linear Technology Corporation "1990 Linear Applications Handbook", Application Note 28, pg. AN28-1, "Thermocouple Measurement". The sum of the hot and cold junction temperature voltages produced by the thermocouple 14 at terminals 10 and 12 and the cold junction compensation generator 16 is the compensated voltage representing the absolute temperature measurement at the location of the thermocouple 14.

A precision thermocouple signal amplifier 18 amplifies the compensated voltage to a usable level and filters the compensated voltage to remove high frequency noise produced by medical equipment in close proximity to the thermocouple 14.

A translation circuit 20 translates the compensated thermocouple voltage into a frequency domain signal which represents the resistance a thermistor will exhibit if the thermistor experiences the same temperature as the thermocouple 14. The translation process is based on a mathematical model derived from the physical characteristics of the thermocouple and the thermistor. The translation circuit 20 accomplishes the translation by means of an analog circuit with an inherent transfer function that emulates the input-output relationship of the mathematical model. A preferred embodiment of the translation circuit is described hereinafter.

An output control stage 22 first measures the excitation current generated by the temperature measuring instrument 8 when connected as shown to the output terminals 4 of the adapter. Based on the value of the excitation current and the value of the temperature signal produced by the translation circuit 20, the output control circuit 22 subsequently generates a voltage at the output terminals 4 which is equivalent to the voltage that the temperature measuring instrument 8 would measure if it were connected instead to a thermistor experiencing the same temperature as the thermocouple 14. A preferred embodiment of the output control stage 22 is described below.

A low power conditioning and management circuit 24 distributes DC power from a power source, such as a nine volt battery 26, to the cold junction compensation generator 16, the precision thermocouple signal amplifier 18, the translation circuit 20, and the output control circuit 22.

Figure 2:
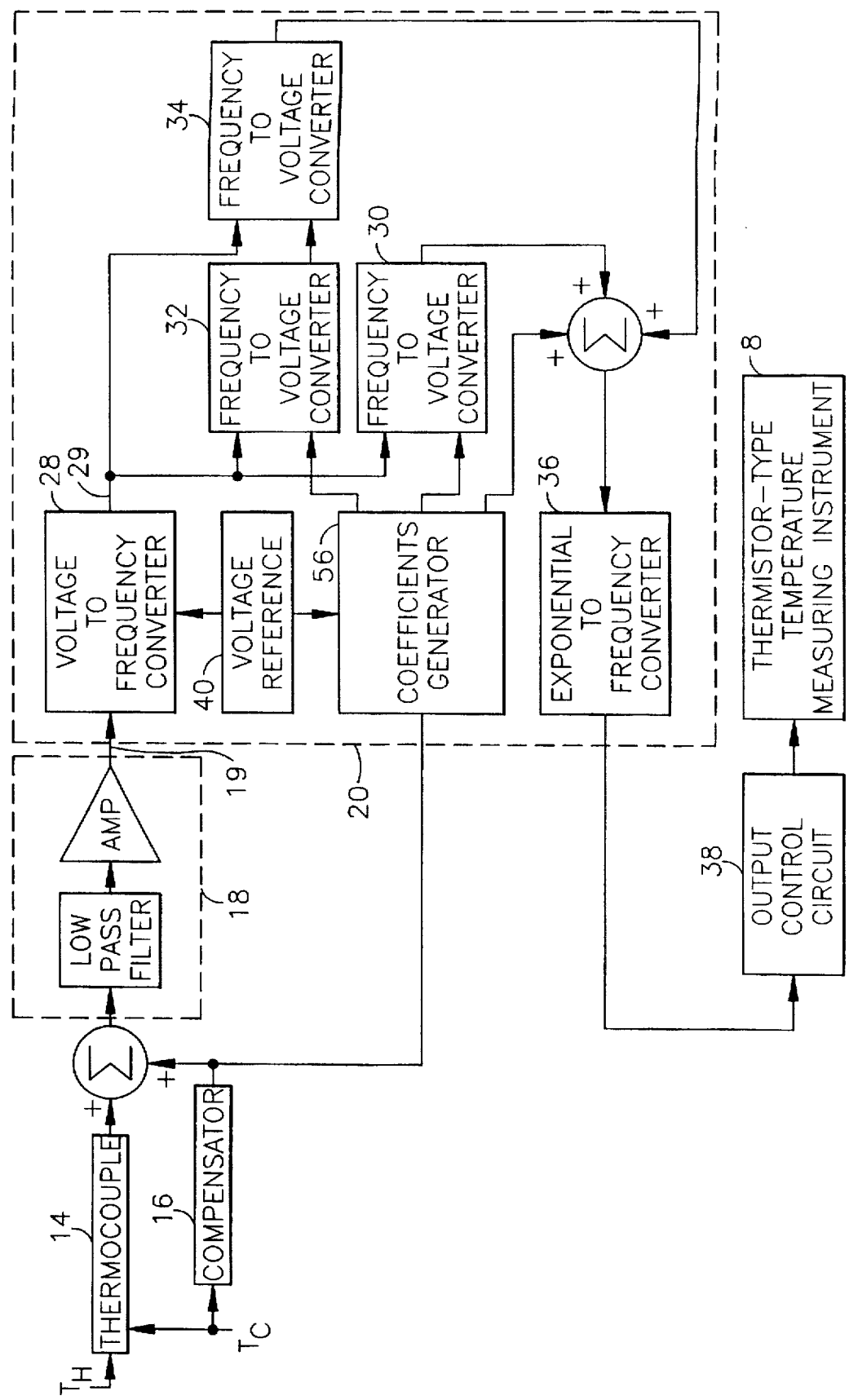
FIG. 2 is a functional signal flow diagram of the adapter.

In FIG. 2, the compensated thermocouple signal voltage $V_c$ is applied to the input of a voltage-to-frequency converter 28 which is a servo circuit that generates a frequency signal $F_c$ as required to balance two current signals. A set-point current signal is set by the input signal voltage $V_c$. A second servo current signal is produced by the output frequency signal $F_c$. The consequence of this servo function is that the frequency signal $F_c$ is proportionally locked to the compensated thermocouple signal voltage $V_c$. A circuit embodiment that produces this relationship has a transfer function that is expressed as:

$$F_c = \frac{V_c}{V_r} \times \frac{1}{R_y \times C_y} \quad (1)$$

where $V_r$ is a fixed reference voltage signal, $R_y$ is the value of a discrete resistor, and $C_y$ is the value of a discrete capacitor. This transfer function is accomplished in the voltage-to-frequency converter 28 by means of commercially available integrated circuits, bipolar transistors, passive resistor elements and passive capacitor elements. A key integrated circuit component of the design is an analog switch with type number LTC1043. Various circuits which accomplish this or related transfer functions using the LTC1043 device are detailed in the Linear Technology Corporation "1990 Linear Applications Handbook", Application Note 14, pg. AN14-1, "Designs for High Performance Voltage-to-Frequency Converters".

A first frequency-to-voltage converter 30 multiplies the compensated cold junction frequency signal $F_c$ with a first-order coefficient signal $V_{coef1}$ and a time constant $R_{x1} \times C_{x1}$.

The first-order coefficient signal $V_{coef1}$ is formed in a coefficients generator 56, the preferred embodiment of which is detailed hereinafter. The first-order voltage signal $V_{1ordr}$ at the output of the first frequency-to-voltage converter 30, is expressed as: where $R_{x1}$ and $C_{x1}$ are fixed passives as before. After substitution of equation (1) for $F_c$, the expression becomes:

$$V_{1ordr} = V_{coef1} \times V_c \times \frac{R_{x1} \times C_{x1}}{V_r \times R_y \times C_y} \quad (2b)$$

This transfer function is accomplished in the first voltage-to-frequency converter 30 by means of commercially available integrated circuits, bipolar transistors, passive resistor elements and passive capacitor elements. A key integrated circuit component of the design is an analog switch device with type number LTC1043. Various circuits which accomplish this transfer function using the LTC1043 device are detailed in the Linear Technology Corporation "1990 Linear Applications Handbook", Application Note 3, pg. AN3-1, "Applications for a Switched-Capacitor Instrumentation Building Block".

A second frequency-to-voltage converter 32 multiplies the compensated cold junction frequency signal $F_c$ with a second-order coefficient signal $V_{coef2}$ and a time constant $R_{x2} \times C_{x2}$. The second-order coefficient signal $V_{coef2}$ is formed in the coefficients generator 56. Again, including the substitution for the cold junction frequency signal $F_c$ using equation (1), the output signal of the second frequency-to-voltage converter 32 is expressed as:

$$V_{coef2} \times F_c \times R_{x2} \times C_{x2} = V_{coef2} \times V_c \times \frac{R_{x2} \times C_{x2}}{V_r \times R_y \times C_y} \quad (3)$$

where $R_{x2}$ and $C_{x2}$ are fixed passives as before. A third frequency-to-voltage converter 34 multiplies the output signal of the second frequency-to-voltage converter 32 with the compensated cold junction frequency signal $F_c$ and the time constant $R_{x2} \times C_{x2}$ to form a second-order voltage signal $V_{2ordr}$. With substitutions of equations (3) and (1), the second-order voltage signal $V_{2ordr}$ is expressed as:

$$V_{2ordr} = V_{coef2} \times V_c \times \frac{R_{x2} \times C_{x2}}{V_r \times R_y \times C_y} \times F_c \times R_{x2} \times C_{x2} \quad (4a)$$

$$V_{2ordr} = V_{coef2} \times V_c \times \frac{R_{x2} \times C_{x2}}{V_r \times R_y \times C_y} \times V_c \times \frac{R_{x2} \times C_{x2}}{V_r \times R_y \times C_y} \quad (4b)$$

$$V_{2ordr} = V_{coef2} \times V_c^2 \times \left( \frac{R_{x2} \times C_{x2}}{V_r \times R_y \times C_y} \right)^2 \quad (4c)$$

This transfer function is accomplished in the second and third voltage-to-frequency converters 32 and 34 by means of commercially available integrated circuits, bipolar transistors, passive resistor elements and passive capacitor elements. Again, a key integrated circuit component of the design is an analog switch device with type number LTC1043, and various circuits which accomplish this transfer function using the LTC1043 device are detailed in the Linear Technology Corporation "1990 Linear Applications Handbook", Application Note 3, pg. AN3-1, "Applications for a Switched-Capacitor Instrumentation Building Block".

A zero-order coefficient signal $V_{coef0}$ is formed in the coefficients generator 56. The zero-order coefficient signal $V_{coef0}$ is summed with the first- and second-order voltage signals $V_{1ordr}$ and $V_{2ordr}$ resulting in a voltage signal $V_{expnt}$ at the input to an exponential-to-frequency converter 36. The voltage signal $V_{expnt}$ is a quadratic function of the compensated thermocouple signal voltage $V_c$ and is expressed as:

$$V_{expnt} = V_{2ordr} + V_{1ordr} + V_{coef0} \quad (5)$$

The quadratic form of $V_{expnt}$ is evident from preceding equations (2b) and (4c) which show the first and second degree dependence of the voltage signals $V_{1ordr}$ and $V_{2ordr}$, respectively, upon the compensated thermocouple signal voltage $V_c$.

The exponential-to-frequency converter 36 incorporates commercially available semiconductor devices with type numbers LTC1043 and MAT-03 along with fixed resistive and capacitive passive elements as before to implement a circuit with a non-linear transfer function that produces an output frequency signal $F_r$ from the $V_{expnt}$ input. This circuit is similar to the voltage-to-frequency converter 28 except for the addition of an exponentiation stage. P-N junctions of the MAT-03 matched bipolar transistor pair are used to produce a differential current signal that is proportional to the base of the natural logarithm, e≅2.718, raised to the power equal to the ratio of the input signal $V_{expnt}$ with the semiconductor thermal voltage, $V_t=(k \times T)/q$ Volts. Here k≅1.381×10$^{-19}$ Coulomb is Boltzmann's Constant, q≅1.602×10$^{-23}$ Joule/Kelvin is the charge of an electron and T is the absolute temperature in Kelvin of the P-N junctions which, in this circuit, is essentially the same as the cold junction temperature. Values of passive elements and coefficient voltage signals $V_{coef0}$, $V_{coef1}$ and $V_{coef2}$ of preceding equations (1) through (5) and equation (6) below are chosen to lock the output frequency signal $F_r$ proportionally to the resistance that a thermistor would exhibit when experiencing the same temperature as the thermocouple 14. The output frequency signal $F_r$ is expressed as:

$$F_r = \frac{1}{R_r \times C_r} \times e^{\frac{V_{expnt}}{V_t}}, \quad (6)$$

where the voltage $V_t$ is proportional to the thermocouple cold junction temperature as described above, and $R_r \times C_r$ is a time constant determined by values of fixed resistor and capacitor passive elements.

The output control circuit 38 produces an output voltage signal $V_o$ at the adapter output terminals 4 which is the same voltage signal that would appear across the terminals of a thermistor when the thermistor experiences the same temperature as the thermocouple 14 when an excitation current $I_{ex}$, supplied by the temperature measuring instrument 8, flows through the thermistor. The output voltage signal $V_o$ is proportional to the product of the excitation current $I_{ex}$ and the output frequency signal $F_r$ which is present at the input to the output control circuit 38.

Figure 3:
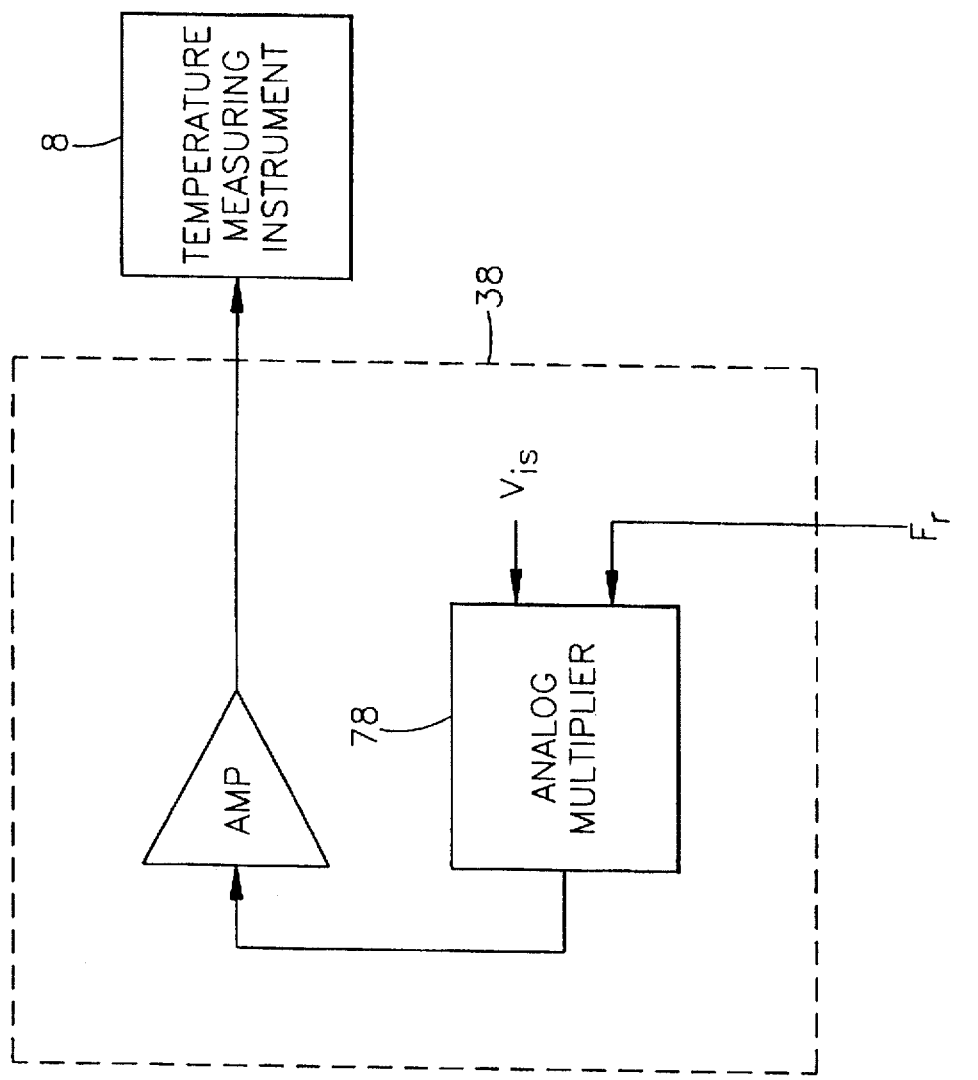
FIG. 3 is a functional signal flow diagram of one embodiment of the output control circuit.

In FIG. 3, one very basic embodiment of the output control circuit 38 is shown. A voltage signal $V_{is}$, proportional to the excitation current $I_{ex}$, is supplied to one input of an analog multiplier circuit 78. The excitation current $I_{ex}$ in this embodiment being a DC current supplied by the temperature measuring instrument 8 at the instrument's input terminal. The output frequency signal $F_r$ is supplied to the other input of the analog multiplier circuit 78. The resulting DC output signal $V_O$ is presented to the input of the temperature measuring instrument 8. The transfer function of the embodiment of the output control circuit as shown in FIG. 3 is expressed as:

$$V_o = F_r \times R_{sxCs} \times V_{is}, \quad (7)$$

where $R_s \times C_s$ is a time constant associated with the multiplier circuit 78, a circuit similar to other multiplier circuits previously mentioned.

Figure 4:
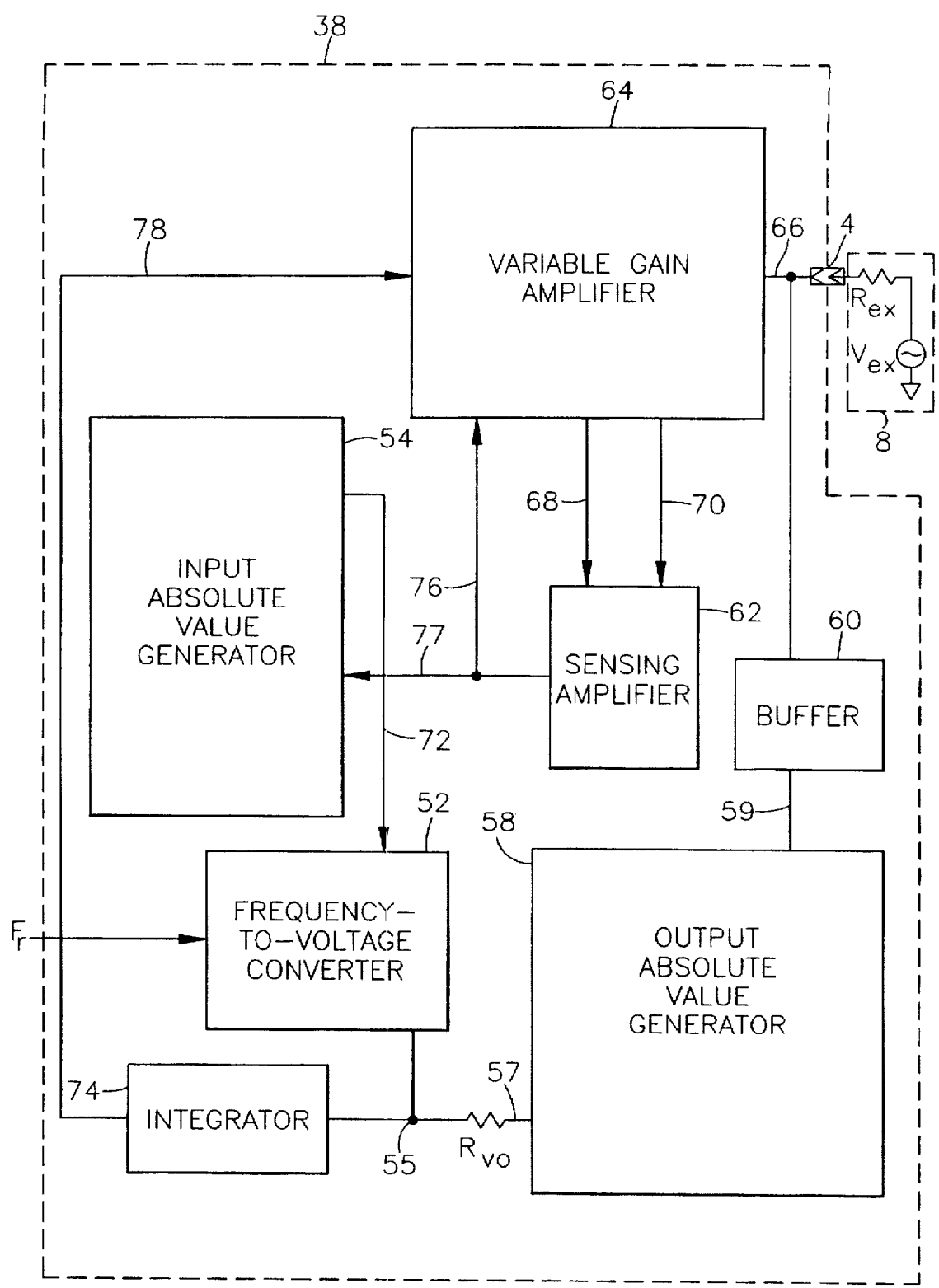
FIG. 4 is a functional signal flow diagram of the preferred embodiment of the output control circuit.

In FIG. 4, a signal flow diagram of the preferred embodiment of the output control circuit 38 is shown, this embodiment being compatible with an AC excitation current $I_{ex}$ or a DC excitation current of either polarity. Depending on whether the polarity of the excitation current $I_{ex}$ flowing through a line 66 is positive or negative, the variable gain amplifier circuit routes the excitation current $I_{ex}$ to the sensing amplifier 62 through either a line 68 or a line 70. The sensing amplifier 62 senses the level of the excitation current $I_{ex}$ and produces a large voltage signal $V_{is}$ at the output of the sensing amplifier 62 which is a replica of the excitation current $I_{ex}$ waveform.

The voltage signal $V_{is}$ at the output of the sensing amplifier 62 is presented to the input of the variable gain amplifier 64 on a line 76. The variable gain amplifier 64 produces the output voltage $V_o$ which replicates the voltage signal $V_{is}$ in form but with magnitude determined by the gain control voltage $V_{gc}$ on a line 78.

The absolute value of the voltage signal $V_{is}$ is generated on a line 72 by the absolute value generator 54. This absolute value voltage signal, $V_{idc}$ is multiplied with the output frequency signal $F_r$ within the fourth frequency-to-voltage converter 52. The current flowing from the output of the fourth frequency-to-voltage converter 52 into the node 55 is expressed as:

$$V_{idc} \times F_r \times C_s, \quad (8)$$

where $C_s$ is a switched passive capacitance within the multiplier circuit of the fourth frequency-to-voltage converter 52. The current signal produced at the output of the fourth frequency-to-voltage converter 52 represents the voltage that a thermistor would exhibit with the excitation current $I_{ex}$ passing through it when the thermistor is exposed to the same temperature as the thermocouple 14.

If, at the instant in time when the temperature measuring instrument 8 is connected to the adapter output terminals 4, the current flowing from the output of the fourth frequency-to-voltage converter 52 is not equivalent to the current flowing through the resistor $R_{vo}$, then the integrator 74 produces a voltage $V_{gc}$ on a line 78 that controls the gain of the variable gain amplifier 64. The gain of the variable gain amplifier 64 changes until the voltage signal $V_{is}$ on the line 76 and the corresponding voltage $V_{idc}$ on the line 72 are brought to such levels that the current flowing out of the fourth frequency-to-voltage converter 52 into the node 55 is equalized with the current flowing out of the node 55 through the resistance $R_{vo}$. When these currents are equalized, the output voltage $V_o$ across the adapter output terminals 4 is equivalent to the voltage which would be across the terminals of a thermistor if the thermistor were exposed to the same temperature as the thermocouple 14.

A buffer 60 and an output absolute value generator 58 provide for the sensing of either polarity of the output voltage $V_o$ without diverting any of the excitation current $I_{ex}$ provided by the temperature measuring instrument 8. The output absolute value generator 58 also rejects any high frequency noise that may be present in the output voltage signal $V_o$.

Figure 5:
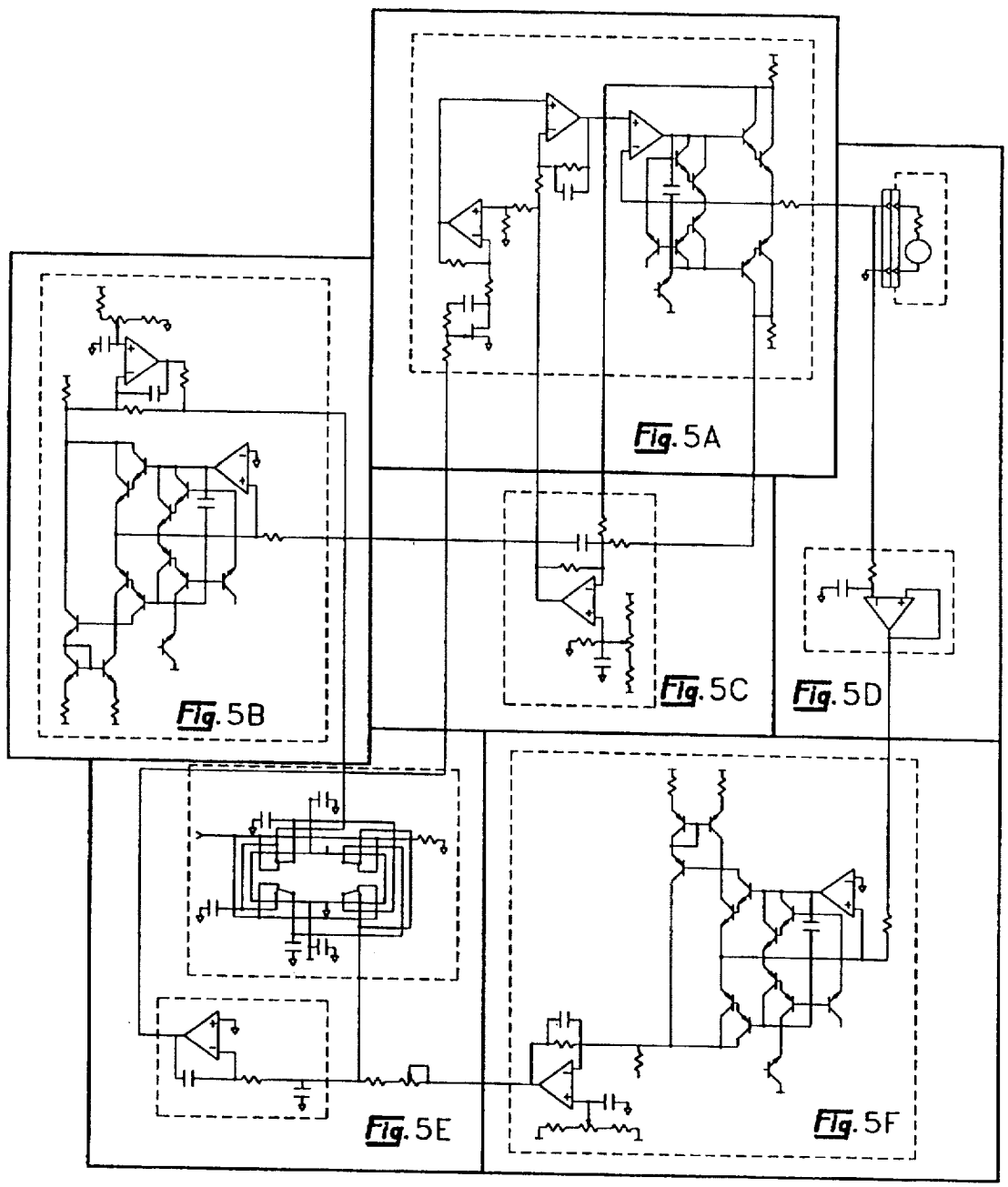
FIG. 5 is a schematic diagram of the preferred embodiment of the output control circuit.

FIG. 5 is a schematic diagram of a preferred embodiment of the output control circuit 38. This figure provides an overview of the complete circuit schematic and indicates the interrelationship of the sub-circuits that are shown in block diagram form in FIG. 4. Each of the sub-circuit schematics, shown in FIGS. 5A through 5F, is described in detail hereinafter.

Figure 5A:
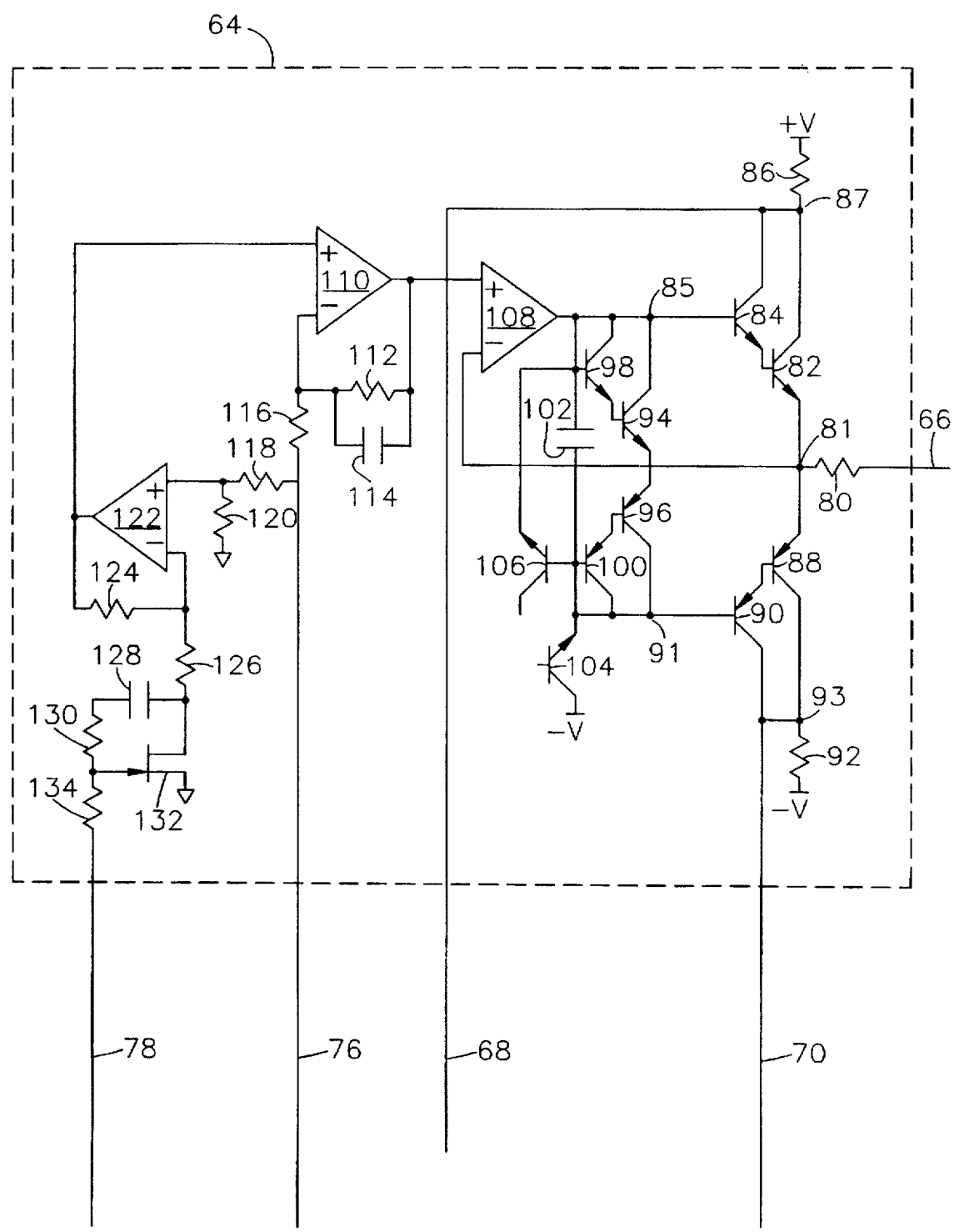
FIG. 5A is a schematic diagram of the preferred embodiment of the variable gain amplifier portion of the output control circuit.

A schematic diagram of the variable gain amplifier 64 of FIG. 4 is shown in FIG. 5A. The excitation current $I_{ex}$, supplied by the temperature measuring instrument 8, flows through a line 66, a resistor 80, and into a node 81. The buffer circuit at the output of an operational amplifier (hereinafter "op-amp") 108 causes all positive-polarity excitation current $I_{ex}$ to flow out of the collectors of the transistors 88 and 90, and all negative-polarity excitation current $I_{ex}$ to flow out of the collectors of the transistors 82 and 84. These positive and negative currents develop proportional voltages at a node 93 determined by resistors 92 and 139 and at a node 87 determined by resistors 86 and 138, respectively. This buffer circuit consists of: (1) the transistor 82 with its emitter connected to the node 81, its collector connected to the node 87 and its base connected to the emitter of a transistor 84, (2) the transistor 84 with its collector connected to the node 87 and its base connected to the output of the op-amp 108 at the node 85, (3) a transistor 94 with its emitter connected to the emitter of a transistor 96, its collector connected to the node 85, and its base connected to the emitter of a transistor 98, (4) the transistor 98 with its collector and base connected to the node 85, (5) the transistor 96 with its collector connected to a node 91 and its base connected to the emitter of a transistor 100, (6) the transistor 100 with its collector and base connected to the node 91, (7) the transistor 104 with its collector connected to the negative supply voltage −V, its collector connected to the node 91, and its base open, (8) a transistor 106 with its emitter connected to the node 85, its collector open, and its base connected to the node 91, (9) a capacitor 102 connected between the nodes 85 and 91, (10) the transistor 90 with its emitter connected to the base of the transistor 88, its collector connected to the line 70 at the node 93, and its base connected to the node 91, and (11) the transistor 88 with its emitter connected to the node 81 and its collector connected to the node 93. The node 81 is connected to the negative input of the op-amp 108, and the output of op-amp 110 is connected to the positive input of the op-amp 108 such that the op-amp 108, with unity gain, maintains a voltage at the node 81 which is equivalent to the voltage signal at the output of op-amp 110. A resistor 86 connected between the positive supply voltage +V and the node 87 provides for the proper bias voltage at the node 87 relative to the positive supply voltage +V. A resistor 92 connected between the negative supply voltage −V and the node 93 provides for the proper bias voltage at the node 93 relative to the negative supply voltage −V.

The amplification function of the variable gain amplifier 64 is accomplished by the op-amps 110 and 122 such that the waveform of voltage signal $V_{is}$ at the output of the sensing amplifier 62 is replicated at the output of op-amp 110, but with a magnitude controlled by the voltage gain signal $V_{gc}$ on the line 78. The two op-amps 110 and 122 are needed to produce a variable gain range that extends from negative to positive values of gain. The gain of this amplifier pair is determined by JFET 132 along with a resistor 124 between the negative input and output of op-amp 122, a resistor 126 between the drain of the JFET 132 and the negative input of op-amp 122, a resistor 118 between the positive input of op-amp 122 and the line 76, a resistor 120 between the positive input of op-amp 122 and ground, a resistor 116 between the negative input of op-amp 110 and the line 76, and a resistor 112 between the negative input and output of op-amp 110.

The variation in the gain of the op-amp 122 is achieved by taking advantage of the dependency of the drain-to-source resistance of the JFET 132 upon the DC component of the voltage gain signal $V_{gc}$ which is applied to the gate of the JFET 132. The drain-to-source resistance of the JFET 132 is experienced by op-amp 122 as a resistor to ground in series with the resistor 126. A resistor 130 and capacitor 128, in series between the gate and drain of JFET 132, along with a resistor 134 between the drain of JFET 132 and the line 78, serve to superimpose half of the AC component of the JFET 132 drain voltage onto the voltage gain signal $V_{gc}$. This reduces distortion at the output of the op-amp 110 when the input voltage signal $V_{is}$ is an AC signal.

Figure 5B:
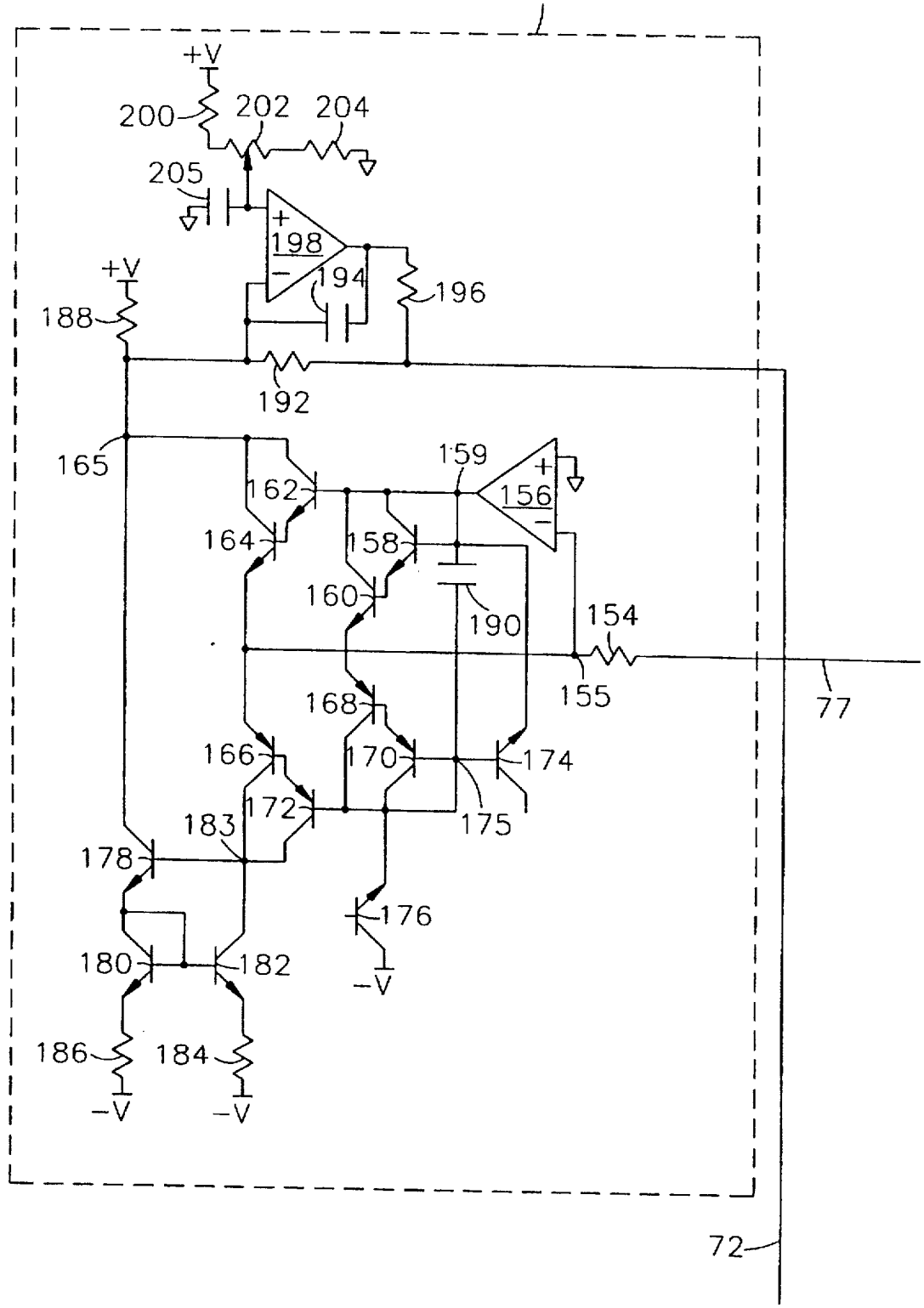
FIG. 5B is a schematic diagram of the preferred embodiment of the input absolute value generator portion of the output control circuit.
Figure 5C:
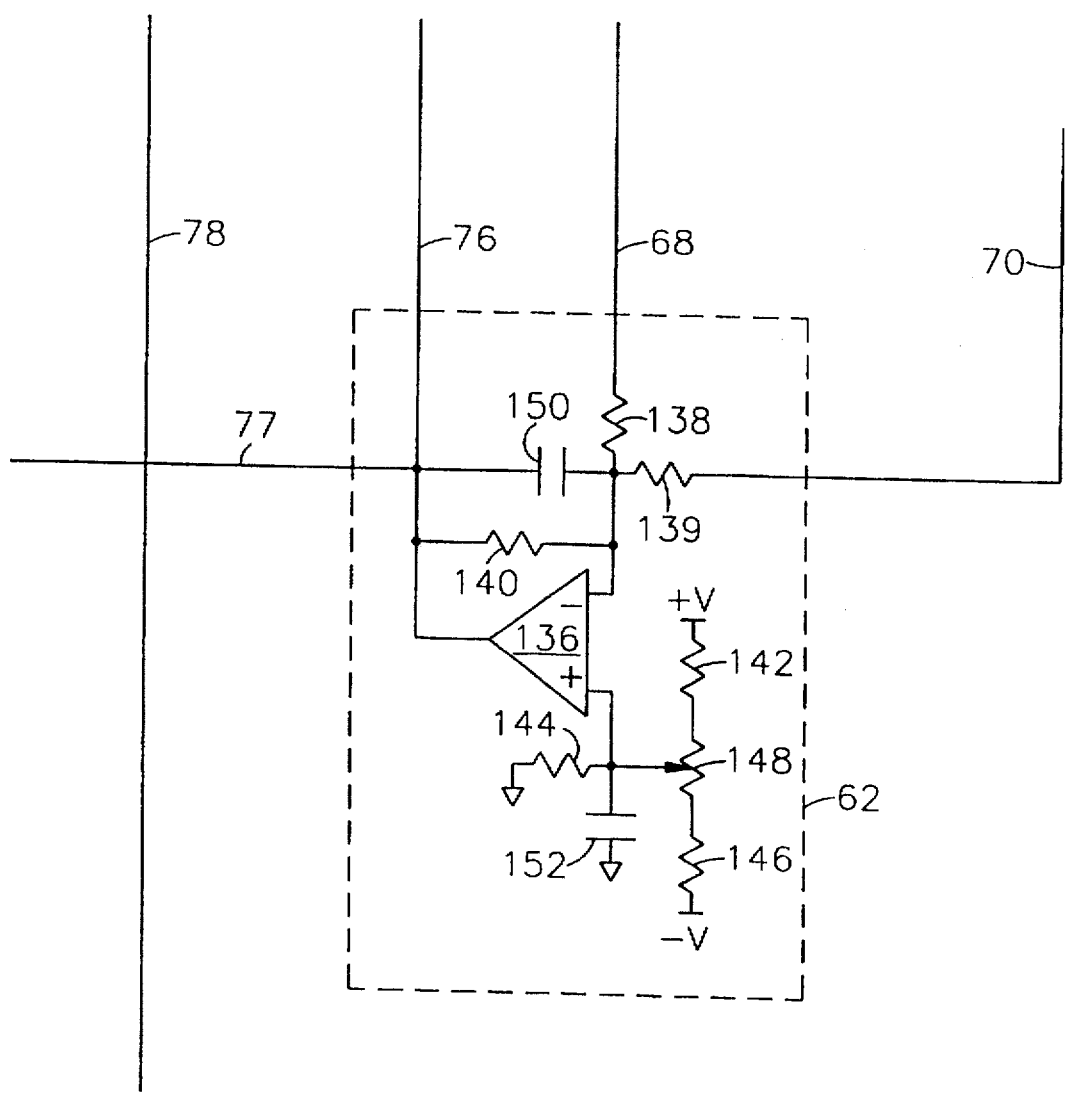
FIG. 5C is a schematic diagram of the preferred embodiment of the sensing amplifier portion of the output control circuit.

With reference to FIG. 5C, the sensing amplifier 62 of FIG. 4 recombines the positive- and negative-polarity portions of the excitation current $I_{ex}$ to form the voltage signal $V_{is}$ on the lines 76 and 77. This recombination function is accomplished by a transresistance summing amplifier consisting of the op-amp 136, a resistor 138 between the negative input of the op-amp 136 and the line 68, a resistor 140 between the negative input and output of op-amp 136, and the resistors 86 and 92 (within the variable gain amplifier 64 block). A capacitor 150 connected in parallel with the resistor 140 provides some relatively high frequency noise rejection. An offset null adjustment circuit is formed by pair of resistors 142 and 146 that are connected in series with a potentiometer 148 between the negative and positive supply voltages, −V and +V, the wiper of the potentiometer 148 being connected to the positive input of the op-amp 136. A resistor 144 and a capacitor 152 are connected in parallel between the wiper of the potentiometer 148 and ground to complete the symmetry between the resistive loads on the positive and negative inputs of op-amp 136. Such symmetry produces rejection of error signals that may arise due to changes in the supply voltages −V and +V. The potentiometer 148 allows for the removal of any DC offset between the voltage signal $V_{is}$ and the excitation current $I_{ex}$ that otherwise may be introduced by the DC errors of the op-amp 136.

The voltage signal $V_{is}$ is fed to the variable gain amplifier 64 through the line 76, the line 76 making connection to the input of the variable gain amplifier 64 between the resistors 116 and 118. The voltage signal $V_{is}$ is also fed to the input absolute value generator 54 over the line 77.

As shown in FIG. 5B, the input absolute value generator 54 of FIG. 4 contains an op-amp and discrete transistor circuit that functions as a precision rectifier to produce an output voltage $V_{idc}$ that is precisely proportional to the input voltage signal $V_{is}$ yet remains a fixed polarity signal with a dominant DC component regardless of the waveform of the input voltage signal $V_{is}$. The relationship between the voltage signal $V_{is}$ and the voltage signal $V_{idc}$ is expressed as:

$$V_{idc}=|V_{is}|. \tag{9}$$

At the input to the input absolute value generator 54 is a buffered amplifier circuit which forces all of the current flowing through a resistor 154, connected between a node 155 and the line 77, to either flow out of the collectors of the transistors 172 and 166 when the current is positive-polarity, or into the collectors of the transistors 164 and 162 when the current is negative-polarity. This buffered amplifier circuit consists of: (1) the transistor 164 with its emitter connected to the node 155, its collector connected to the positive supply voltage +V through a resistor 188, and its base connected to the emitter of a transistor 162, (2) the transistor 162 with its collector connected to the positive supply voltage +V through a resistor 188, and its base connected to the output of the op-amp 156 at a node 159, (3) a transistor 160 with its emitter connected to the emitter of a transistor 168, its collector connected to the node 159, and its base connected to the emitter of a transistor 158, (4) the transistor 158 with its collector and base connected to the node 159, (5) the transistor 168 with its collector connected to the node 175 and its base connected to the emitter of a transistor 170, (6) the transistor 170 with its collector and base connected to the node 175, (7) the transistor 176 with its collector connected to the negative supply voltage −V, its emitter connected to the node 175, and its base open, (8) a transistor 174 with its emitter connected to the node 159, its collector open, and its base connected to the node 175, (9) a capacitor 190 connected between the nodes 159 and 175, (10) the transistor 172 with its emitter connected to the base of the transistor 166, its collector connected to a node 183, and its base connected to the node 175, and (11) the transistor 166 with its emitter connected to the node 155 and its collector connected to the node 183. A resistor 188 connected between the positive supply voltage +V and the node 165 provides for the proper bias voltage relative to the positive supply voltage +V at the node 165.

The circuit consisting of a set of transistors 178, 180, and 182 is a current mirror which inverts the polarity of the positive current flowing through the resistor 154 and sums it with the negative current flowing through the resistor 154 to form a current signal which is a rectified version of the voltage signal $V_{is}$. The emitter of the transistor 178 is connected to the collector and base of the transistor 180 and to the base of the transistor 182. The base of the transistor 178 and the collector of the transistor 182 are connected to the node 183. A pair of resistors 184 and 186, between the emitters of transistors 182 and 180 respectively, set the proper bias voltage relative to the negative supply voltage −V at the emitters of the transistors 182 and 180.

An op-amp 198 along with a capacitor 194 between the negative input and output of the op-amp 198, a resistor 192 between the negative input of the op-amp 198 and the line 72, and a resistor 196 between the output of op-amp 198 and the line 72 form a transresistance amplifier that produces the output voltage signal $V_{idc}$ on the line 72. The function of the resistor 196 is to de-couple the output of the op-amp 198 of the input absolute value generator 54 from the highly capacitive load of the fourth frequency-to-voltage converter 52 to ensure stable operation of the op-amp 198.

With continued reference to FIG. 5B, an offset null adjustment circuit is formed by pair of resistors 200 and 204 that are connected in series with a potentiometer 202 between the positive supply voltage +V and ground, the wiper of the potentiometer being connected to the positive input of the op-amp 198. A capacitor 205 is connected between the positive input of the op-amp 198 and ground. This adjustment allows the removal of any DC offset between the output voltage signal $V_{idc}$ on the line 72 and the input voltage signal $V_{is}$ on the line 77 that otherwise may be introduced by the DC errors of the op-amps 156 and 198. Again, symmetry between the resistive loads on the positive and negative inputs of the op-amp 198 provides rejection of supply voltage +V at the output of the input absolute value generator 54.

Figure 5D:
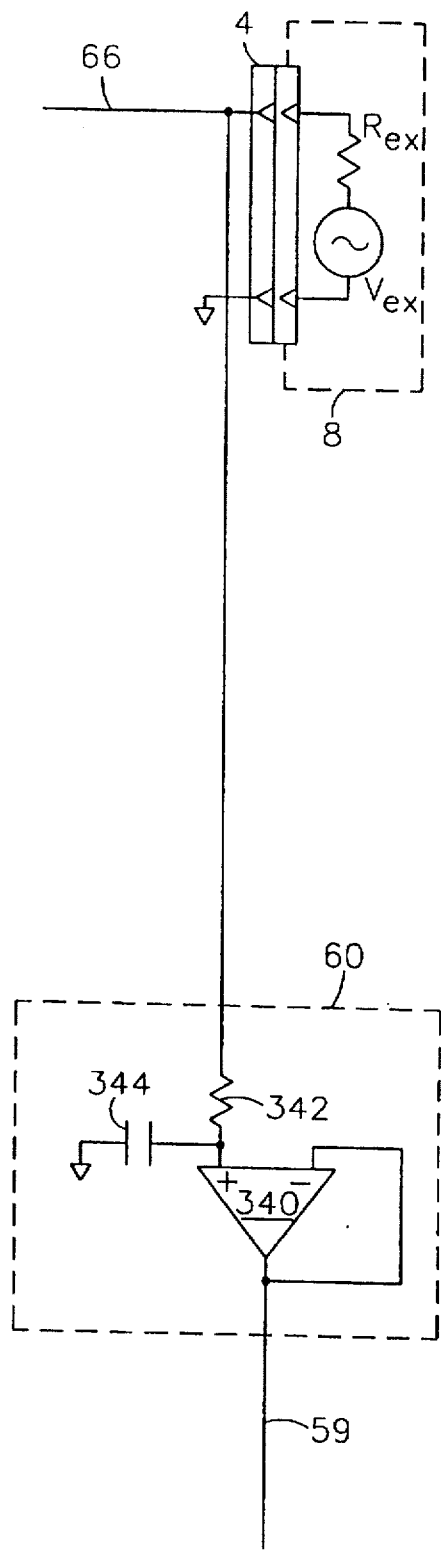
FIG. 5D is a schematic diagram of the preferred embodiment of the buffer portion of the output control circuit.
Figure 5E:
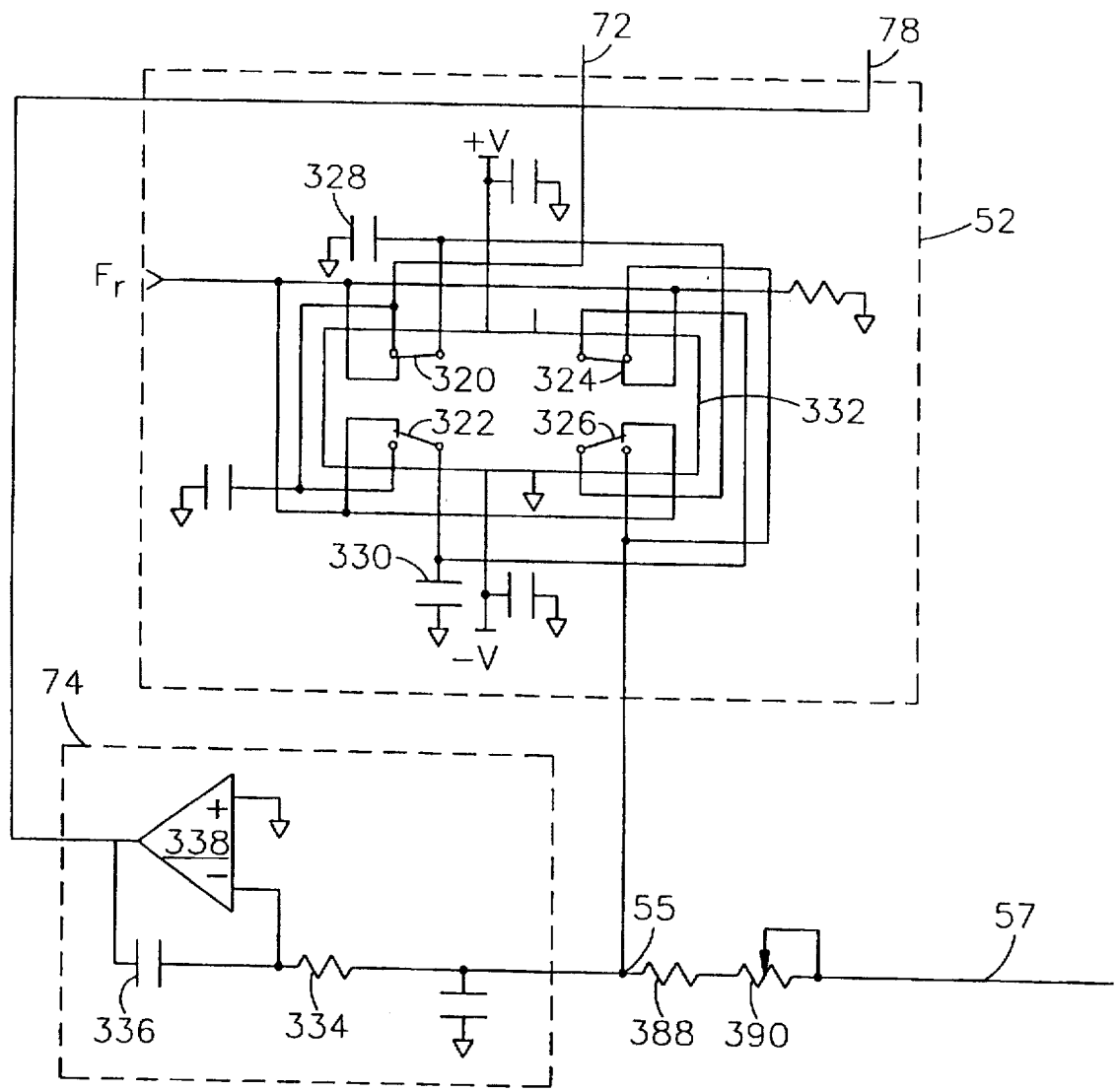
FIG. 5E is a schematic diagram of the preferred embodiments of the frequency-to-voltage converter and integrator portions of the output control circuit.

As shown in FIG. 5E, the voltage signal $V_{idc}$ is fed via the line 72 to a pair of switches 320 and 322 within an integrated circuit 332, this integrated circuit 332 forming the core of the fourth frequency-to-voltage converter 52. These switches alternately close and open at the rate of the frequency signal $F_r$ to charge a pair of capacitors 328 and 330 to the voltage $V_{idc}$. The switches 324 and 326, also within the integrated circuit 332, alternately open and close at the same rate $F_r$ to discharge the capacitors 328 and 330 into the node 55. The capacitor 328 is charged and the capacitor 330 is discharged over a half-cycle of the frequency signal $F_r$. During the next half-cycle, the capacitor 328 is discharged and the capacitor 330 is charged. The sum of the values of the capacitors 328 and 330 is designated as $C_s$ which appears in the preceding equation (8).

Also shown in FIG. 5E is the integrator 74 of FIG. 4. The integrator 74 consists of an op-amp 338 with a resistor 334 between the negative input of the op-amp 338 and the node 55, and a capacitor 336 between the negative input and output of the op-amp 338. The positive input of the op-amp 338 is grounded. As noted above, the integrator 74 drives the voltage $V_{gc}$ on the line 78 to such a level as necessary to keep the voltage at the input of the integrator 74 at zero volts DC, thereby ensuring that the capacitors 328 and 330 are fully discharged during every cycle of the frequency signal $F_r$. This results in a current entering the node 55 that is precisely equal to the product of the voltage $V_{idc}$, the frequency signal $F_r$, and the capacitance $C_s$ as in the preceding equation (8). Thus, all the current entering the node 55 from the switched capacitors 328 and 330 exits the node 55 on a line 57.

As shown in FIG. 5D, the buffer 60 of FIG. 4 consists of an op-amp 340, whose positive input is connected to the line 66 at the adapter output terminals 4 through a resistor 342, and a capacitor 344 between the positive input to the op-amp 340 and ground. The negative input of the op-amp 340 is connected to its output, thus producing unity voltage gain. The buffer 60 produces at its output, on a line 59, a voltage signal $V_{ob}$ which is essentially the same as the output voltage $V_o$ at the adapter terminals 4.

Figure 5F:
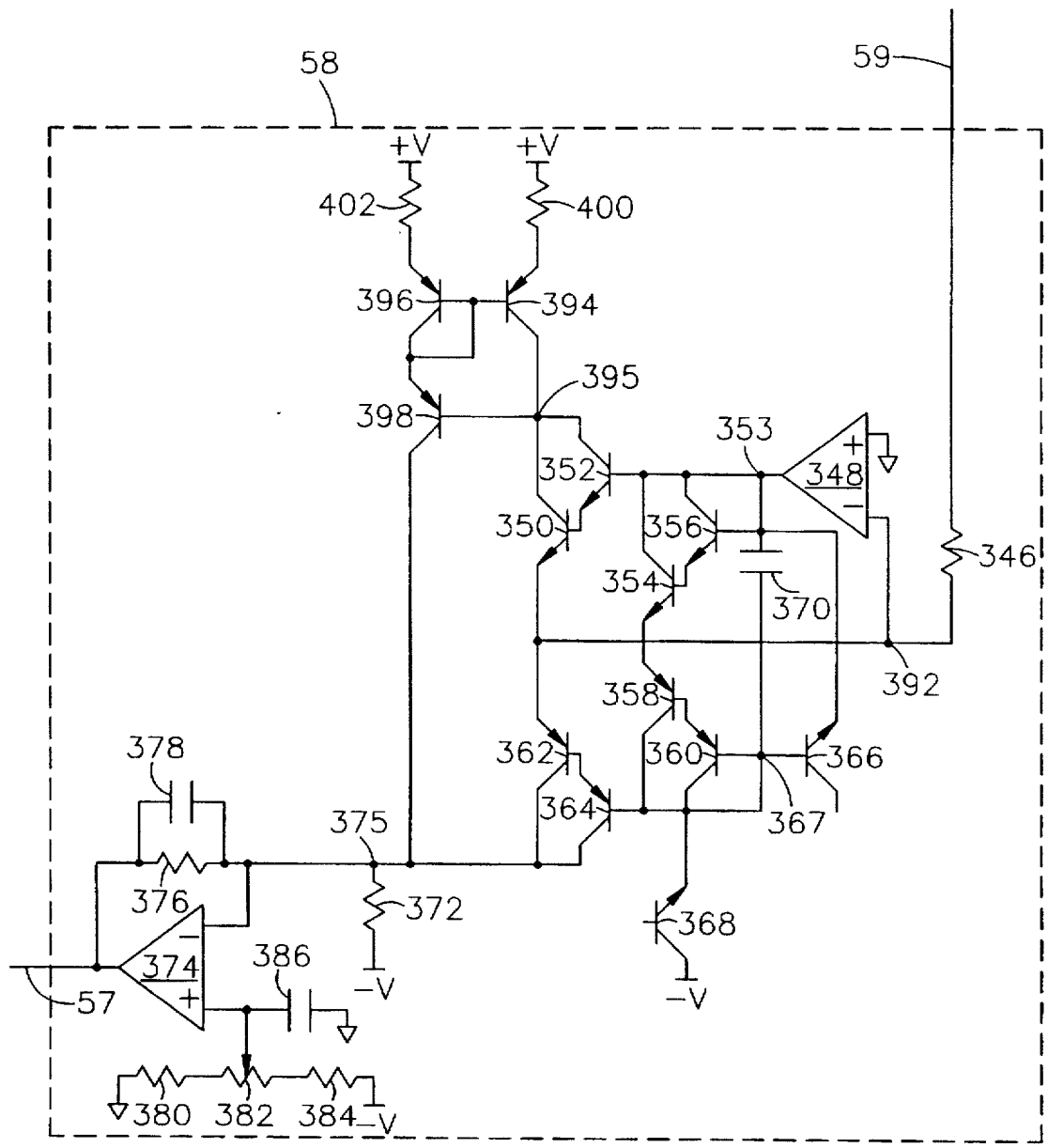
FIG. 5F is a schematic diagram of the preferred embodiment of the output absolute value generator portion of the output control circuit.

With reference to FIG. 5F; the output absolute value generator 58 of FIG. 4 contains an op-amp and discrete transistor circuit that functions as a precision rectifier to produce an output voltage $V_{odc}$ on the line 57 that is precisely proportional to the input voltage signal $V_{ob}$ on the line 59. The output voltage $V_{odc}$ remains a fixed polarity signal with a dominant DC component regardless of the waveform of the input voltage signal $V_{ob}$. The relationship between $V_{ob}$ and $V_{odc}$ is expressed as:

$$V_{odc} = -|V_{ob}|. \qquad (10)$$

At the input to the output absolute value generator 58 is a buffered amplifier circuit which forces all of the current flowing through a resistor 346, connected between a node 392 and the output of the buffer op-amp 340, to flow either out of the collectors of the transistors 362 and 364 when the current is positive-polarity, or into the collectors of the transistors 350 and 352 when the current is negative-polarity. This amplified buffer circuit consists of: (1) the transistor 350 with its emitter connected to the node 392, its collector connected to a node 395, and its base connected to the emitter of a transistor 352, (2) the transistor 352 with its collector connected to the node 395, and its base connected to a node 353, (3) a transistor 354 with its emitter connected to the emitter of a transistor 358, its collector connected to the node 353, and its base connected to the emitter of a transistor 356, (4) the transistor 356 with its collector and base connected to the node 353, (5) the transistor 358 with its collector connected to a node 367 and its base connected to the emitter of a transistor 360, (6) the transistor 360 with its collector and base connected to the node 367, (7) the transistor 368 with its collector connected to the negative supply voltage −V, its emitter connected to the node 367, and its base open, (8) a transistor 366 with its emitter connected to the node 353, its collector open, and its base connected to the node 367, (9) a capacitor 370 between the nodes 353 and 367, (10) the transistor 364 with its emitter connected to the base of the transistor 362, its collector connected to a node 375, and its base connected to the node 367, and (11) the transistor 362 with its emitter connected to the node 392 and its collector connected to the node 375. A resistor 372 between the node 375 and the negative supply voltage −V sets the proper bias voltage relative to the negative supply voltage $-V$ at the node 375.

With continued reference to FIG. 5F, the circuit consisting of a set of transistors 394, 396, and 398 is a current mirror which inverts the polarity of the negative current flowing through the resistor 346 and sums it with the positive current flowing through the resistor 346 to form a current signal which is a rectified version of the voltage signal $V_{ob}$. The emitter of the transistor 398 is connected to the collector and base of the transistor 396 and to the base of the transistor 394, while the base of the transistor 398 is connected to the collector of the transistor 394 at the node 395. A pair of resistors 400 and 402, between the emitters of the transistors 394 and 396 respectively, set the proper bias voltage relative to the positive supply voltage $+V$ at the emitters of the transistors 394 and 396.

The op-amp 374, along with a capacitor 378 and a resistor 376 in parallel between the negative input and output of the op-amp 374, form a transresistance amplifier that produces the output voltage signal $V_{odc}$. The input of this transresistance amplifier is the negative input of the op-amp 374 which is connected to the node 375.

An offset null adjustment circuit is formed by pair of resistors 380 and 384 that are connected in series with a potentiometer 382 between the negative supply voltage $-V$ and ground, the wiper of the potentiometer 382 being connected to the positive input of the op-amp 374. A capacitor 386 is connected between the positive input of the op-amp 374 and ground. This adjustment circuit allows the removal of any DC offset between the output voltage signal $V_{odc}$ and the input voltage signal $V_{ob}$ that otherwise may be introduced by the DC errors of the op-amps 348 and 374. Again, symmetry between the resistive loads on the positive and negative inputs of the op-amp 374 provides rejection of the negative supply voltage $-V$ at the output of the output absolute value generator 58.

Referring again to FIG. 5E, the resistance $R_{vo}$ between the node 55 and the line 57 consists of a series combination of a resistor 388 and a potentiometer 390. The potentiometer 390 provides adjustment for removal of any scaling error between the frequency signal $F_r$ and the output voltage signal $V_o$ at the output terminals 4. Such scaling error is introduced by unavoidably imperfect values of passive circuit elements.

A preferred embodiment of the invention provides for the generation of the zero-, first-, and second-order coefficient signals, $V_{coef0}$, $V_{coef1}$, and $V_{coef2}$, which are produced from respective weighted summations of the fixed reference voltage signal $V_r$ and the thermocouple cold junction temperature voltage $V_{cj}$. Recall that the signal $V_{cj}$ is produced by the cold junction compensation generator 16 and represents a measurement of the cold junction temperature. By design, the adapter cold junction temperature is the same as the adapter ambient temperature. There are a number of parameters of the preferred embodiment circuitry that are dependent upon the ambient temperature experienced by constituent circuits. To varying degrees, this temperature dependence is common to all electronic circuits. Salient examples of such ambient or cold junction temperature dependence within the preferred embodiment are: unavoidable appearance of the thermal voltage signal $V_t$ in the transfer function of the exponential-to-frequency converter 36; imperfection in the thermocouple compensation due to slight non-linearity of the thermocouple 14 temperature-to-voltage characteristic; and drift of the DC error signals inherent to the precision thermocouple signal amplifier 18.

The coefficients generator 56 generates the coefficient signals $V_{coef0}$, $V_{coef1}$, and $V_{coef2}$ of the quadratic voltage signal $V_{expnt}$ (equation (5)) in such a manner that variations in the values of the coefficients due to variations in the thermocouple cold junction temperature, as measured by the thermocouple cold junction temperature voltage $V_{cj}$, cancel the effects of the circuit parameter temperature dependencies listed above. Without such compensation, these temperature dependencies would be experienced by the temperature measuring instrument 8 as error relative to the actual temperature of the thermocouple 14 when the instrument 8 is used in ambient temperatures other than the temperature at which the adapter translation function was calibrated. With correct compensation, changes in the ambient room temperature have minimal effect on the accuracy of the desired temperature measurement.

Figure 6:
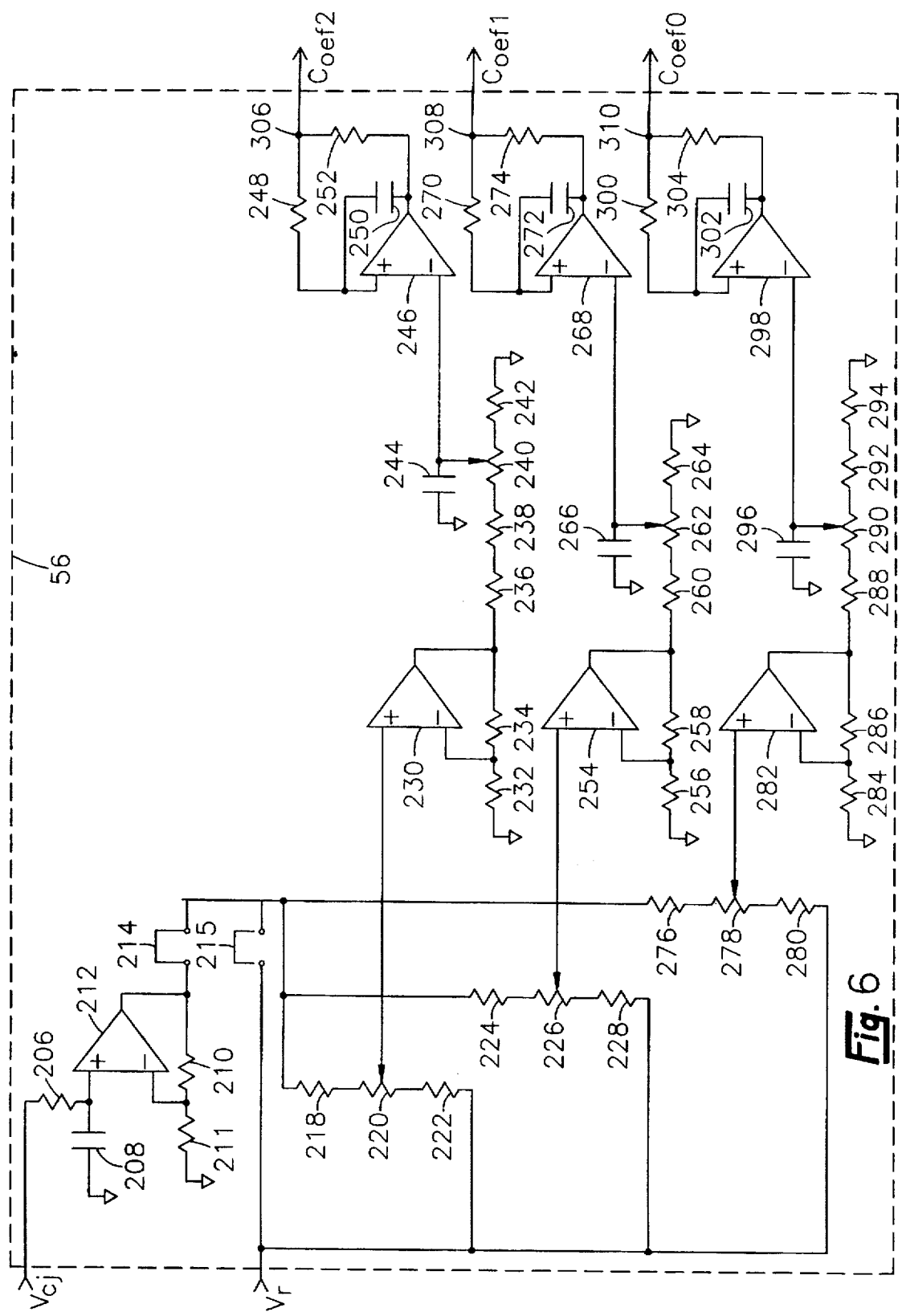
FIG. 6 is a schematic diagram of the preferred embodiment of the coefficients generator.

In FIG. 6, the preferred embodiment of the coefficients generator 56 is shown in a normal operational mode. Prior to normal operation, this circuit must be calibrated such that, with known thermocouple hot and cold junction temperatures, the zero-, first-, and second-order coefficient signals, $V_{coef0}$, $V_{coef1}$, and $V_{coef2}$, are at levels which: (1) lead to correct translation of the cold junction temperature signal voltage $V_c$ into a thermistor temperature voltage signal, and (2) compensate for circuit parameter ambient or cold junction temperature dependencies described above. This calibration is accomplished by adjusting a series of six potentiometers 240, 262, 290, 220, 226, and 278 to minimize the error in the temperature measured by the temperature measuring instrument 8 relative to the actual temperature of the thermocouple 14 over the temperature range in which the instrument 8 is typically used.

The first step in calibration is accomplished with a first jumper 215 in place and a second jumper 214 removed, so that the reference voltage $V_r$ is applied to the positive inputs of a series of op-amps 230, 254, and 282, and this voltage is independent of the settings of the first, second, and third potentiometers 220, 226, and 278. In this configuration, the fourth, fifth, and sixth potentiometers 240, 262, and 290 are adjusted by a skilled operator to minimize the error in the temperature measured by the temperature measuring instrument 8 relative to the actual temperature of the thermocouple 14 at an ambient temperature corresponding to the compensation null temperature explained below.

The second step in calibration is accomplished with the first jumper 215 removed and the second jumper 214 in place. In this mode, which is also the normal operational mode, the thermocouple cold junction temperature voltage $V_{cj}$ is scaled by an amplifier circuit consisting of an op-amp 212 with a resistor 206 connected to its positive input, a capacitor 32 between its positive input and ground, a resistor 210 across its negative input and output, and a resistor 211 between the negative input and ground. The output of this amplifier circuit is the thermocouple cold junction temperature voltage $V_{cj}$ scaled to equal the reference voltage $V_r$ at an ambient temperature referred to as the compensation null temperature. The compensation null temperature is set by this circuit to be close to the midrange point of the operating ambient temperature range specified for the adapter. This results in there being no effect from the compensation function during normal operation of the adapter at an ambient temperature equal to the compensation null temperature. Only to the extent that the actual ambient temperature of the adapter moves above or below the compensation null temperature is error due to ambient temperature shift in the adapter temperature measurement compensated. At such ambient temperatures, it is the contribution of the thermocouple cold junction temperature voltage $V_{cj}$ via the output signal of the op-amp 212 to the coefficient signals $V_{coef0}$, $V_{coef1}$, and $V_{coef2}$ that produces the compensation.

The signal at the output of the op-amp 212 is presented to the positive input of an op-amp 230 through a resistor 218 and the first potentiometer 220. The reference voltage $V_r$ is also presented to the positive input the op-amp 230 except through a resistor 222 and the other end of potentiometer 220. The relative values of the resistor 218, the resistor 222, and the potentiometer 220 along with the wiper position of the potentiometer 220 determine the attributes of the ambient temperature compensation built into the second-order coefficient signal $V_{coef2}$. The value of the potentiometer 220 relative to the values of the resistors 218 and 222 determine the possible range of adjustment to the compensation property of the coefficient signal $V_{coef2}$.

The resistors 232, 234, 236, 238, and 242, the potentiometer 240, and the op-amp 230 produce the coefficient signal $V_{coef2}$ from the compensated second-order signal presented to the positive input of the op-amp 230. The topology of the network is such that the coefficient signal $V_{coef2}$ is produced at a correct level when the wiper of the potentiometer 240 is near mid-position and all circuit elements of the adapter are in ideal design-base states. The value of the potentiometer 240, relative to the values of the resistors 236, 238 and 242, determines the range of calibration adjustment of the signal $V_{coef2}$. This value is set just large enough to overcome the "worst case" combination of circuit element tolerances. With a resistor 232 between ground and the negative input of the op-amp 230, and a resistor 234 between the negative input and the output of the op-amp 230, the signal at the input to op-amp 230 is amplified to produce a over-scaled version of the second-order coefficient signal level $V_{coef2}$ at the output of the op-amp 230. The signal at the output of the op-amp 230 is divided by a pair of resistors 236 and 238, the fourth potentiometer 240 and a resistor 242. The wiper of potentiometer 240 is the output of the divider and is connected to the input of an op-amp 246. The coefficient signal $V_{coef2}$ is developed here at the positive input of op-amp 246. A unity gain buffer amplifier circuit at the output of the coefficients generator 56 maintains the second-order coefficient signal level $V_{coef2}$ at a node 306 by isolating the divider from the large load on the node 306 created by the connection of the switched capacitor circuit of the second frequency-to-voltage converter 32. The level of the coefficient signal $V_{coef2}$ at the node 306 is in the range required for correct translation when multiplied with the compensated cold junction frequency signal $F_c$ in the second frequency-to-voltage converter 32 (equations 3 through 4c). This buffer circuit consists of the op-amp 246 with a capacitor 250 between the negative input and output, a resistor 248 between the negative input and circuit the node 306, a resistor 252 between the output and node 306, and a capacitor 244 between the positive input and ground.

The signal at the output of the op-amp 212 is also presented to the positive input of an op-amp 254 through a resistor 224 and the second potentiometer 226. The reference voltage $V_r$ is also presented to the positive input of op-amp 254 except through a resistor 228 and the other end of potentiometer 226. The relative values of the resistor 224, the resistor 228, and the potentiometer 226, along with the wiper position of the potentiometer 226, determine the attributes of the ambient temperature compensation built into the coefficient signal $V_{coef1}$. The value of the potentiometer 226 relative to the values of the resistors 224 and 228 determines the possible range of adjustment to the compensation property of coefficient signal $V_{coef1}$.

The resistors 256, 258, 260, and 264, the potentiometer 262, and the op-amp 254 produce the coefficient signal $V_{coef1}$ from the compensated first-order signal presented to the positive input of the op-amp 254. Again, as with the second-order circuit, the topology of the network is such that the coefficient signal $V_{coef1}$ is produced at a correct level when the wiper of the potentiometer 262 is near mid-position and all circuit elements of the adapter are in ideal design-base states. The value of the potentiometer 262 relative to the values of the resistors 260 and 264 determines the range of calibration adjustment of the signal $V_{coef1}$ which is set just large enough to overcome the "worst case" combination of circuit element tolerances. With a resistor 256 connected between ground and the negative input of the op-amp 254, and a resistor 258 connected between the negative input and the output of the op-amp 254, the signal at the input to the op-amp 254 is amplified to produce an over-scaled version of the first-order coefficient signal level $V_{coef1}$ at the output of the op-amp 254. The signal at the output of the op-amp 254 is divided by a resistor 260, the fifth potentiometer 262, and the resistor 264. The wiper of the fifth potentiometer 262 is the output of the divider and is connected to the input of an op-amp 268. The coefficient signal $V_{coef1}$ is developed here at the positive input of the op-amp 268. A unity gain buffer amplifier circuit at the output of the coefficients generator 56 maintains the first-order coefficient signal level $V_{coef1}$ at a node 308 by isolating the divider from the large load on the node 308 created by the connection of the switched capacitor circuit of the first frequency-to-voltage converter 30. The level of the coefficient signal $V_{coef1}$ is in the range required for correct translation when multiplied with the compensated cold junction frequency signal $F_c$ in the second frequency in the first frequency-to-voltage converter 30 (equations 2a and 2b). This buffer circuit consists of the op-amp 268 with a capacitor 272 between the negative input and output, a resistor 270 between the negative input and node 308, a resistor 274 between the output and the node 308, and a capacitor 266 between the positive input and ground.

The signal at the output the of op-amp 212 is also presented to the positive input of an op-amp 282 through a resistor 276 and the third potentiometer 278. The reference voltage $V_r$ is also presented to the positive input of the op-amp 282 except through a resistor 280 and the other end of the potentiometer 278. The relative values of the resistor 276, the resistor 280, and the potentiometer 278 along with the wiper position of the potentiometer 278 determine the attributes of the ambient temperature compensation built into the coefficient signal $V_{coef0}$. The value of the potentiometer 278 relative to the values of the resistors 276 and 280 determines the possible range of adjustment to the compensation property of coefficient signal $V_{coef0}$.

The resistors 284, 286, 288, 292, and 294, the potentiometer 290, and the op-amp 282 produce the coefficient signal $V_{coef0}$ from the compensated first-order signal presented to the positive input of the op-amp 282. Again, as with the second-order circuit, the topology of the network is such that the coefficient signal $v_{coef0}$ is produced at a correct level when the wiper of the potentiometer 290 is near mid-position and all circuit elements of the adapter are in ideal design-base states. The value of the potentiometer 290 relative to the values of the resistors 288, 292 and 294 determines the range of calibration adjustment of the coefficient signal $V_{coef0}$ which is set just large enough to overcome the "worst case" combination of circuit element tolerances. With a resistor 284 between ground and the negative input of the op-amp 282, and a resistor 286 between the negative input and the output of the op-amp 282, the signal at the input to the op-amp 282 is amplified to produce an over-scaled version of the zero-order coefficient signal level $V_{coef0}$ at the output of the op-amp 282. The level of the signal at the output of op-amp 282 is in the range required for summation with first- and second-order voltage signals $V_{1ordr}$ and $V_{2ordr}$. The signal at the output of the op-amp 282 is divided by a resistor 288, the sixth potentiometer 290, and the resistors 292 and 294. The wiper of the potentiometer 290 is the output of the divider and is connected to the input of an op-amp 298. A unity gain buffer amplifier circuit at the output of the coefficients generator 56 maintains the zero-order coefficient signal level $V_{coef0}$ at a node 310 by isolating the divider from the large load on the node 310 created by the connection of the outputs of the switched capacitor circuits of the first and third frequency-to-voltage converters 30 and 34. The level of the coefficient signal $V_{coef0}$ at the node 310 is in the range required for correct translation when summed with the first- and second-order voltage signals $V_{1ordr}$ and $V_{2ordr}$ (equation 5). This buffer circuit consists of the op-amp 298 with a capacitor 302 between the negative input and output, a resistor 300 between the negative input and the node 310, a resistor 304 between the output and the node 310, and a capacitor 296 between the positive input and ground.

During the second calibration step, the first potentiometer 220 is adjusted by a skilled operator to achieve the optimum shape of the curve of the temperature-measurement-error-versus- measurement-temperature function. The second potentiometer 226 is adjusted to achieve the optimum slope of the curve, and the third potentiometer 278 is adjusted to achieve the optimum offset of the curve.

At the completion of the calibration steps, the error in the measured temperature introduced by the preferred embodiment of the adapter circuit is less than ±0.5° C. over the temperature measurement range of 0° to 50° C., and less than ±0.2° C. over the temperature measurement range of 20° to 50° C.

It is contemplated, and the foregoing specification, drawings, and examples will make it apparent to those skilled in the art, that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. An adapter for a temperature measuring instrument, the instrument of a type compatible with a thermistor temperature sensor at the instrument's input, the adapter receiving at its input an electrical voltage produced by a thermocouple temperature sensor, the adapter providing at its output a signal which varies as a function of temperature, the signal being equivalent to the signal produced by a thermistor temperature sensor exposed to the same temperature as the thermocouple, temperature sensor, the adapter comprising:

a conversion circuit which converts the electrical voltage produced by the thermocouple temperature sensor into an amplified first electrical signal representing the temperature at the location of the thermocouple temperature sensor;

a translation circuit which translates the first electrical signal at the output of the conversion circuit without any analog-to-digital signal conversion into an analog second electrical signal which is proportional to an electrical voltage that would exist across the terminals of a thermistor temperature sensor exposed to the same temperature as the thermocouple temperature sensor; and an output control circuit which produces an output voltage at the adapter's output terminals, the output voltage varying as a function of the second electrical signal at the output of the translation circuit, the output voltage being equivalent to the electrical voltage which would exist across the terminals of a thermistor temperature sensor if the thermistor temperature sensor was connected to the temperature measuring instrument's input and was exposed to the same temperature as the thermocouple temperature sensor.

2. An adapter as set forth in claim 1 wherein the translation circuit comprises an analog circuit with an inherent transfer function, the output of the transfer function being the analog second electrical signal representing the voltage which would exist across the terminals of a thermistor temperature sensor if the thermistor temperature sensor were exposed to the same temperature as the thermocouple temperature sensor, and the input to the transfer function is the first electrical signal from the conversion circuit.

3. An adapter as set forth in claim 1 wherein the translation circuit comprises an analog circuit with an inherent transfer function, the output of the transfer function being an analog electrical signal $F_r$ representing the voltage which would exist across the terminals of a thermistor temperature sensor if the thermistor temperature sensor were exposed to the same temperature as the thermocouple temperature sensor, and the input to the transfer function is the conversion circuit output voltage $V_c$, the transfer function being defined by the equation:

$$F_r = \frac{1}{R_r \times C_r} \times e^{\frac{V_{expnt}}{V_t}}$$

where:

$R_r$ is a known resistance;

$C_r$ is a known capacitance;

$V_t$ is given by the equation:

$$V_t = \frac{k \times T}{q}$$

where:

$k \cong 1.381 \times 10^{-19}$ Coulomb;

$q \cong 1.602 \times 10^{-23}$ Joule/degree Kelvin; and

T is the absolute temperature in degrees Kelvin at the location of the conversion circuit;

and where $V_{expnt}$ is given by the equation:

$$V_{expnt} \cong V_{2ordr} + V_{1ordr} + V_{coef0}$$

where:

$$V_{2ordr} = V_{coef2} \times V_c^2 \times \left( \frac{R_{x2} \times C_{x2}}{V_r \times R_y \times C_y} \right)^2$$

and $$V_{1ordr} = V_{coef1} \times V_c \times \frac{R_{x1} \times C_{x1}}{V_r \times R_y \times C_y}$$

and where:

$V_{coef0}$ is a zero order coefficient signal voltage generated by the translation circuit;

$V_{coef1}$ is a first order coefficient signal voltage generated by the translation circuit;

$V_{coef2}$ is a second order coefficient signal voltage generated by the translation circuit;

$R_{x1}$, $R_{x2}$, and $R_y$ are known resistances;

$C_{x1}$, $C_{x2}$, and $C_y$ are known capacitances;

$V_c$ is the first electrical signal; and $V_r$ is a fixed reference signal voltage.

4. An adapter as set forth in claim 1 wherein the translation circuit is comprised of:

means for producing a first frequency signal which is proportional to the amplified first electrical signal from the conversion circuit;

means for producing zero-, first-, and second-order coefficient voltage signals, the values of which vary only as a function of the ambient temperature at the location of the adapter;

means for multiplying the first frequency signal with the second-order coefficient voltage signal to produce an intermediate voltage signal which varies as a function of the temperature at the location of the thermocouple temperature sensor and as a function of the ambient temperature at the location of the adapter;

means for multiplying the first frequency signal with the intermediate voltage signal to produce a second-order product voltage signal which varies as a function of the temperature at the location of the thermocouple temperature sensor and as a function of the ambient temperature at the location of the adapter;

means for multiplying the first frequency signal with the first-order coefficient voltage signal to produce a first-order product voltage signal which varies as a function of the temperature at the location of the thermocouple temperature sensor and as a function of the ambient temperature at the location of the adapter;

means for summing the first-order product voltage signal, the second-order product voltage signal, and the zero-order coefficient voltage signal to form a quadratic voltage signal; and means for producing a second frequency signal which corresponds to the analog second electrical signal at the output of the translation circuit, the second frequency signal being proportional to an exponential function of the quadratic voltage signal.

5. An adapter as set forth in claim 4 wherein the translation circuit is comprised of means for adjusting the levels of the zero-, first-, and second-order coefficient voltage signals whereby variations in circuit signal levels produced by variations in the ambient temperature at the location of the adapter are canceled out, thus making the second frequency signal independent of the variations in temperature at the location of the adapter.

6. An adapter as set forth in claim 1 wherein the output control circuit is comprised of:

means for sensing an excitation current provided by the temperature measuring instrument connected at the adapter's output terminals, and means for providing a voltage at the adapter's output terminals, the voltage varying as a function of the analog second electrical signal at the output of the translation circuit, and the voltage being equivalent to the voltage which would exist across the terminals of a thermistor temperature sensor exposed to the same temperature as the thermocouple temperature sensor when the thermistor temperature sensor is provided with a current equivalent to the excitation current provided by the temperature measuring instrument at the adapter's output terminals.

7. A method for converting a signal produced by a thermocouple temperature sensor into a new signal equivalent to a signal which would appear across the terminals of a thermistor temperature sensor exposed to the same temperature as the thermocouple temperature sensor, the new signal being compatible with a temperature measuring instrument designed for use with a thermistor temperature sensor, the method comprising the steps of:

converting the signal produced at the terminals of the thermocouple temperature sensor into an amplified voltage representing the absolute temperature at the location of the thermocouple temperature sensor;

translating the electrical voltage resulting from the conversion step without any analog-to-digital conversion into an analog electrical signal which is proportional to an electrical voltage that would exist across the terminals of a thermistor temperature sensor exposed to the same temperature as the thermocouple temperature sensor; and producing an output voltage varying as a function of the analog electrical signal that results from the translation step, the output voltage being equivalent to the voltage across the terminals of a thermistor temperature sensor if the thermistor temperature sensor was connected to the temperature measuring instrument's input and was exposed to the same temperature as the thermocouple temperature sensor.

8. The method of claim 7, wherein the translation step comprises:

producing a first frequency signal which is proportional to the amplified voltage resulting from the conversion step;

producing zero-, first-, and second-order coefficient voltage signals, the values of which vary only as a function of ambient temperature;

multiplying the first frequency signal with the second-order coefficient voltage signal to produce an intermediate voltage signal which varies as a function of the temperature at the location of the thermocouple temperature sensor and as a function of ambient temperature;

multiplying the first frequency signal with the intermediate voltage signal to produce a second-order product voltage signal which varies as a function of the temperature at the location of the thermocouple temperature sensor and as a function of ambient temperature;

multiplying the first frequency signal with the first-order coefficient voltage signal to produce a first-order product voltage signal which varies as a function of the temperature at the location of the thermocouple temperature sensor and as a function of ambient temperature;

summing the first-order product voltage signal, the second-order product voltage signal, and the zero-order coefficient voltage signal to form a quadratic voltage signal; and producing a second frequency signal which corresponds to the analog electrical signal at the output of the translation circuit, the second frequency signal being proportional to an exponential function of the quadratic voltage signal.

9. The method of claim 7, wherein the output voltage production step comprises:

sensing an excitation current provided by the temperature measuring instrument, and providing a voltage which varies as a function of the analog electrical signal and is equivalent to the voltage which would exist across the terminals of a thermistor temperature sensor exposed to the same temperature as the thermocouple temperature sensor when the thermistor temperature sensor is provided with a current equivalent to the excitation current provided by the temperature measuring instrument.

10. An apparatus for the measurement of temperature, comprising:

a thermocouple temperature sensor, a temperature measuring instrument of a type compatible with a thermistor temperature sensor at the instrument's input terminals, and an adapter with output terminals connected to the input terminals of the temperature measuring instrument, the adapter receiving at its input terminals an electrical voltage produced by the thermocouple temperature sensor, the adapter providing at its output terminals a signal which varies as a function of temperature, the signal being equivalent to a signal produced by a thermistor temperature sensor exposed to the same temperature as the thermocouple temperature sensor, the adapter comprising:

a conversion circuit which converts an electrical voltage produced by the thermocouple temperature sensor into an amplified first electrical signal that represents the temperature at the location of the thermocouple temperature sensor;

a translation circuit which translates the first electrical signal at the output of the conversion circuit without any analog-to-digital conversion into an analog second electrical signal which is proportional to an electrical voltage that would exist across the terminals of a thermistor temperature sensor exposed to the same temperature as the thermocouple temperature sensor; and an output control circuit which produces an output voltage at the adapter's output terminals, the output voltage varying as a function of the second electrical signal at the output of the translation circuit, the output voltage being equivalent to the electrical voltage which would exist across the terminals of a thermistor temperature sensor if the thermistor temperature sensor was connected to the temperature measuring instrument's input and was exposed to the same temperature as the thermocouple temperature sensor.

11. A temperature measuring apparatus as set forth in claim 10 wherein the translation circuit of the adapter comprises an analog circuit with an inherent transfer function, the output of the transfer function being the analog signal electrical signal representing the voltage which would exist across the terminals of a thermistor temperature sensor if the thermistor temperature sensor were exposed to the same temperature as the thermocouple temperature sensor, and the input to the transfer function is the amplified first electrical signal from the conversion circuit.

12. A temperature measuring apparatus as set forth in claim 10 wherein the translation circuit of the adapter is comprised of:

means for producing a first frequency signal which is proportional to the amplified first electrical signal from the conversion circuit;

means for producing zero-, first-, and second-order coefficient voltage signals, the values of which vary only as a function of the ambient temperature at the location of the adapter;

means for multiplying the first frequency signal with the second-order coefficient voltage signal to produce an intermediate voltage signal which varies as a function of the temperature at the location of the thermocouple temperature sensor and as a function of the ambient temperature at the location of the adapter;

means for multiplying the first frequency signal with the intermediate voltage signal to produce a second-order product voltage signal which varies as a function of the temperature at the location of the thermocouple temperature sensor and as a function of the ambient temperature at the location of the adapter;

means for multiplying the first frequency signal with the first-order coefficient voltage signal to produce a first-order product voltage signal which varies as a function of the temperature at the location of the thermocouple temperature sensor and as a function of the ambient temperature at the location of the adapter;

means for summing the first-order product voltage signal, the second-order product voltage signal, and the zero-order coefficient voltage signal to form a quadratic voltage signal; and means for producing a second frequency signal which corresponds to the analog second electrical signal at the output of the translation circuit, the second frequency signal being proportional to an exponential function of the quadratic voltage signal.

13. A temperature measuring apparatus as set forth in claim 10 wherein the translation circuit of the adapter is comprised of means for adjusting the levels of the zero-, first-, and second-order coefficient voltage signals whereby variations in circuit signal levels produced by variations in the ambient temperature at the location of the adapter are canceled out, thus making the second frequency signal independent of the variations in temperature at the location of the adapter.

14. A temperature measuring apparatus as set forth in claim 10 wherein the output control circuit of the adapter is comprised of:

means for sensing an excitation current provided by the temperature measuring instrument connected at the adapter's output terminals, and means for providing a voltage at the adapter's output terminals, the voltage varying as a function of the analog second electrical signal at the output of the translation circuit, and the voltage being equivalent to the voltage which would exist across the terminals of a thermistor temperature sensor exposed to the same temperature as the thermocouple temperature sensor when the thermistor temperature sensor is provided with a current equivalent to the excitation current provided by the temperature measuring instrument at the adapter's output terminals.

* * * * *

UNITED STATES PATENT AND TRADEMARK OFFICE
CERTIFICATE OF CORRECTION

PATENT NO. : 5,735,605
DATED : April 7, 1998
INVENTOR(S) : Allen V. Blalock

It is certified that error appears in the above-identified patent and that said Letters Patent is hereby corrected as shown below:

Column 6, line 5, after "as:" insert $$-- V_{1ordr} = V_{coef1} \times F_c \times R_{x1} \times C_{x1} \qquad (2a) --$$

Signed and Sealed this

Sixteenth Day of June, 1998

Attest:

BRUCE LEHMAN

Attesting Officer

Commissioner of Patents and Trademarks